(12) United States Patent
Zhang

(10) Patent No.: US 11,143,794 B2
(45) Date of Patent: Oct. 12, 2021

(54) OPTICAL FILM

(71) Applicant: SHINE OPTOELECTRONICS (KUNSHAN) CO., LTD, Kunshan (CN)

(72) Inventor: Jian Zhang, Kunshan (CN)

(73) Assignee: SHINE OPTOELECTRONICS (KUNSHAN) CO., LTD, Kunshan (CN)

( * ) Notice: Subject to any disclaimer, the term of this patent is extended or adjusted under 35 U.S.C. 154(b) by 202 days.

(21) Appl. No.: 15/865,241

(22) Filed: Jan. 8, 2018

(65) Prior Publication Data

US 2018/0196166 A1    Jul. 12, 2018

Related U.S. Application Data

(63) Continuation of application No. PCT/CN2016/089080, filed on Jul. 7, 2016.

(30) Foreign Application Priority Data

| Jul. 8, 2015 | (CN) | ......................... 201510397444.8 |
| Jul. 8, 2015 | (CN) | ......................... 201510397668.9 |

(Continued)

(51) Int. Cl.
  *G02B 1/04*      (2006.01)
  *G02B 1/18*      (2015.01)
  (Continued)

(52) U.S. Cl.
  CPC ............. *G02B 1/04* (2013.01); *B42D 25/324* (2014.10); *B42D 25/342* (2014.10); *G02B 3/00* (2013.01);
  (Continued)

(58) Field of Classification Search
  CPC .................................................. G02B 27/2214
  See application file for complete search history.

(56) References Cited

U.S. PATENT DOCUMENTS

| 3,636,147 A | 1/1972 | Rowland |
| 6,329,040 B1 | 12/2001 | Oshima et al. |

(Continued)

FOREIGN PATENT DOCUMENTS

| CN | 1525211 A | 9/2004 |
| CN | 1579732 A | 2/2005 |

(Continued)

OTHER PUBLICATIONS

Chinese Search Report dated Dec. 19, 2018, for Chinese Patent Application No. 201510397870.1 (English translation included).

(Continued)

*Primary Examiner* — Ian A Rummel
(74) *Attorney, Agent, or Firm* — Hamilton, Brook, Smith & Reynolds, P.C.

(57) ABSTRACT

This application discloses an optical film, comprising: a polymer having a first surface and a second surface, the first surface and the second surface opposing to each other; a microlens structure being formed on the first surface, an accommodation structure being formed on the second surface, the accommodation structure accommodating a number of pattern structures imaging through the microlens structure; the microlens structure and the accommodation structure being integral; and the micro-focusing units and the pattern structures being adapted to each other, so that the optical film forms at least one image floating in the optical film when the optical film is viewed from a side of the pattern structures or a side of the micro-focusing units. A substrate layer is omitted from the optical film, hence, the optical film is reduced in thickness, and mechanical perfor- (Continued)

mance is not good, which makes the optical film easy to be cut in thermoprinting.

15 Claims, 11 Drawing Sheets

(30) Foreign Application Priority Data

| | | |
|---|---|---|
| Jul. 8, 2015 | (CN) | 201510397870.1 |
| Jul. 8, 2015 | (CN) | 201520487868.9 |
| Jul. 8, 2015 | (CN) | 201520488516.5 |
| Jul. 8, 2015 | (CN) | 201520489822.0 |
| Oct. 23, 2015 | (CN) | 201510699172.7 |
| Oct. 23, 2015 | (CN) | 201520827379.3 |

(51) Int. Cl.

| | |
|---|---|
| *G02B 3/00* | (2006.01) |
| *B42D 25/342* | (2014.01) |
| *B42D 25/324* | (2014.01) |
| *G02B 30/00* | (2020.01) |
| *G02B 30/27* | (2020.01) |

(52) U.S. Cl.
CPC ........... *G02B 3/0043* (2013.01); *G02B 30/00* (2020.01); *G02B 30/27* (2020.01); *G02B 1/041* (2013.01); *G02B 1/18* (2015.01)

(56) References Cited

U.S. PATENT DOCUMENTS

| | | | |
|---|---|---|---|
| 6,404,555 B1 | 6/2002 | Nishikawa | |
| 7,333,268 B2 | 2/2008 | Steenblik et al. | |
| 7,468,842 B2 | 12/2008 | Steenblik et al. | |
| 2007/0121207 A1* | 5/2007 | Miyaki | G03B 21/625 |
| | | | 359/455 |
| 2007/0273143 A1 | 11/2007 | Crane et al. | |
| 2008/0278806 A1 | 11/2008 | Uehara et al. | |
| 2011/0019283 A1 | 1/2011 | Steenblik et al. | |
| 2011/0075256 A1 | 3/2011 | De Zwart et al. | |
| 2011/0209328 A1 | 9/2011 | Steenblik et al. | |
| 2012/0327517 A1 | 12/2012 | Van Den Berg | |
| 2013/0278872 A1 | 10/2013 | Teller et al. | |
| 2015/0289370 A1 | 10/2015 | Gao et al. | |
| 2016/0349524 A1 | 12/2016 | Pijlman et al. | |
| 2017/0246900 A1* | 8/2017 | Cote | G02B 3/0056 |

FOREIGN PATENT DOCUMENTS

| | | | |
|---|---|---|---|
| CN | 1595310 | A | 3/2005 |
| CN | 1906547 | A | 1/2007 |
| CN | 101169496 | A | 4/2008 |
| CN | 101434176 | A | 5/2009 |
| CN | 101443692 | A | 5/2009 |
| CN | 101506693 | A | 8/2009 |
| CN | 101767511 | A | 7/2010 |
| CN | 101850680 | A | 10/2010 |
| CN | 102047169 | A | 5/2011 |
| CN | 102405434 | A | 4/2012 |
| CN | 102455447 | A | 5/2012 |
| CN | 102497994 | A | 6/2012 |
| CN | 102514443 | A | 6/2012 |
| CN | 102540318 | A | 7/2012 |
| CN | 102708946 | A | 10/2012 |
| CN | 102725674 | A | 10/2012 |
| CN | 102906627 | A | 1/2013 |
| CN | 202720396 | U | 2/2013 |
| CN | 102991860 | A | 3/2013 |
| CN | 103874585 | A | 6/2013 |
| CN | 103207702 | A | 7/2013 |
| CN | 103309047 | A | 9/2013 |
| CN | 103832114 | A | 6/2014 |
| CN | 104024921 | A | 9/2014 |
| CN | 104118236 | A | 10/2014 |
| CN | 104155707 | A | 11/2014 |
| CN | 104203528 | A | 12/2014 |
| CN | 104221071 | A | 12/2014 |
| CN | 104647936 | A | 5/2015 |
| CN | 205272920 | U | 6/2016 |
| CN | 205280964 | U | 6/2016 |
| CN | 205374781 | U | 7/2016 |
| CN | 205374782 | U | 7/2016 |
| CN | 205507122 | U | 8/2016 |
| CN | 205507123 | U | 8/2016 |
| CN | 205608222 | U | 9/2016 |
| CN | 106324716 | A | 1/2017 |
| CN | 106324725 | A | 1/2017 |
| CN | 106324726 | A | 1/2017 |
| CN | 106324846 | A | 1/2017 |
| CN | 106338786 | A | 1/2017 |
| CN | 205912318 | U | 1/2017 |
| CN | 205958785 | U | 2/2017 |
| DE | 102011115125 | A1 | 4/2013 |
| JP | 2000081501 | U | 3/2000 |
| WO | 2013053435 | A1 | 4/2013 |

OTHER PUBLICATIONS

Dunn, D., et al., "Personalized, Three-Dimensional Floating Images for ID Documents", 3M Safety, Security, & Protection Services Laboratory, pp. 1-15. (no date given).

Dunn, D.S, et al., "Three-Dimensional Floating Images as Overt Security Features", 3M Safety, Security, & Protection Services Laboratory, SPIE-IS&T/vol. 6075 60750G-1-60750G-10, 2006.

International Search Report for International Application No. PCT/CN2016/089080 dated Sep. 27, 2016, "Optical Film", 3 pages.

Search Report for Chinese Patent Application No. 201510397444.8 dated Sep. 29, 2017 (3 pages).

Search Report for Chinese Patent Application No. 201510699172.7 dated Oct. 9, 2017 (3 pages).

Final Office Action dated Mar. 30, 2020 in U.S. Appl. No. 15/865,239; "Optical Film"; (11 pages).

International Search Report and Written Opinion for Int'l Application No. PCT/CN2016/089111, titled: Optical Film, dated Sep. 29, 2016.

International Preliminary Report on Patentability for Int'l Application No. PCT/CN2016/089111, titled: Optical Film, dated Jan. 9, 2018.

International Preliminary Report on Patentability for Int'l Application No. PCT/CN2016/089080, titled: Optical Film, dated Jan. 9, 2018.

Non-Final Office Action dated Aug. 4, 2020 in U.S. Appl. No. 15/865,239; (7 pages).

* cited by examiner

OPTICAL FILM

CROSS REFERENCE TO RELATED APPLICATIONS

This application is a continuation of International Application No. PCT/CN2016/089080, which designated the United States and was filed on Jul. 7, 2016, published in Chinese, which claims the benefits of Chinese patent applications No. 2015204898220, No. 2015103978701, No. 2015103974448, No. 2015204885165 and No. 2015204878689, filed on Jul. 8, 2015, and No. 2015106991727 and No. 2015208273793, filed on Oct. 23, 2015, and No. 2015103976689, filed on Jul. 8, 2015, the entire teachings of which are incorporated herein by reference.

FIELD

This disclosure relates to the field of optical films, and in particular to an optical film.

Brief Description of Related Developments More and more attention has been paid to various 3D imaging techniques in the fields of information, display, medicine, and military affairs, etc. It has wide potentials and foregrounds to achieve 3D imaging by using the microlens technique. It is developed from the integrated photography proposed by G. Lippman in 1908, in which a group of 2D unit images having different perspective relationships in a 3D scenario are collected and recorded by a lens array and image, and a 3D image of an original scenario may be directly viewed in front of a display microlens array without need of special viewing spectacles and lighting. As the development of manufacture processes of microlens arrays and population of high-resolution printing and image sensors, more and more attention is drawn to the integrated imaging technique, and various performances of the integrated imaging and display techniques, such as a depth of view, an angle of view, and a resolution, are also relatively greatly improved.

In recent years, two types of outstanding progresses have been made in the development of the integrated imaging optical films. One is personalized 3D dynamic space imaging endorsement, such as that a lens of a large numerical aperture (NA>0.3) is used to cause a laser beam to be converged in front of or behind the microlens array, convergence points are collected and recorded by the microlens array in the laser recording material under the microlens array, the positions of the convergence points of the laser beam relative to the position of the microlens array are changed to form graphs, and a special visual effect of 3D dynamic space imaging is finally formed, by viewing a sample from a side of the microlens array, which was proposed by Douglas Dunn, et al, of 3M Corporation of US, in *Personalized, Three Dimensional Floating Images for ID Documents*, and subsequent *Three-Dimensional Floating Images as Overt Security Features*, SPIE-IS&T/Vol. 607560750G-10. As microlens imaging needs to be used and a substrate material needs to be ablated in this method, the resolution is relative low. And the other one is based on the Moire imaging technique, which uses a focusing function of a microlens array to amplify a micro pattern high efficiently, so as to achieve a pattern having a certain depth of view and presenting a spectacular dynamic effect. U.S. Pat. No. 7,333,268B2 and Chinese patent No. 201080035671.1 disclose a microlens array security element for a windowing security line applicable to such valuable securities as bills, and its basic structure is: providing a periodic microlens array on an upper surface of a transparent substrate layer, and providing a corresponding periodic micro-pattern array on a lower surface of the transparent substrate layer, the micro-pattern array being located on or near a focal plane of the microlens array, arrangement of the micro-pattern array being substantially identical to that of the microlens array, moire amplification imaging being performed on the micro-pattern array by the microlens array; and an optical imaging film constituted by transmission focusing units, with a thickness being generally greater than three times of a radius of curvature of a microlens. Hence, in order to reduce the thickness of the film, a microlens unit of a small aperture must be used. For example, as a thickness of a security line of a piece of bill paper must be less than 50 microns, a diameter of the microlens unit must also be less than 50 microns. And a smaller microlens unit limits a size of a micro-pattern, and limits a design space of the micro-pattern.

In order to overcome the above limitations, Chinese patents No. CN104118236A, No. CN201310229569.0 and No. CN201410327932.7 propose a micro reflective focusing element array optical anti-counterfeiting unit and a valuable item, in which a periodic micro reflective focusing element array is used, a thickness of a film may be reduced to be less than a radius of curvature of the micro reflective focusing element, and a periodic amplified graphic and text structure may still be obtained. When the imaging film is tilted side to side or forward and backward, images of multiple other amplified pattern structures may enter into the viewing area. Chinese patent No. ZL201010180251.4 proposes an optical anti-counterfeiting element and a product using the optical anti-counterfeiting element, in which a transmission operational mode is based, central coordinates of transmission microlenses within a transmission microlens array layer are randomly distributed within the microlens array layer, and the microlenses in the microlens array layer correspond to micro graphics and texts in a micro graphic and text layer one by one. Three defects exist in the structure mentioned in this patent that: 1. as a transmission microlens array is used, a total thickness of the micro-focusing unit layer, the transparent spacer layer and the graphic and text structure layer will be greater than the aperture of the micro-focusing element; 2. as a position coordinate relationship between the microlens array located on the first surface of the substrate material and the micro graphic and text array is not defined, scientifically theoretically speaking, such a structure will not produce a Moire image in many cases; and 3. when the elements are used, people may view an amplified graphic and text image from a side of the microlens unit layer, and if the surface of the microlens array is covered by such transparent external articles as water, the focusing microlens will not function any longer, which brings inconvenience to practical use.

In many cases, people expect to obtain a unique image having a stereoscopically floating effect. Hence, it is necessary that a new solution is proposed, in which a more spectacular 3D visual effect is provided, being not affected by an angle of view of an viewer, drawing more eyes of the people, making the people obtained a shocking visual effect, being convenient in viewing, and enhancing weather resistance of the device.

Currently, an imaging film in the prior art mainly includes a substrate layer 10, a microlens layer 11 and an outwardly convex pattern layer 12, as shown in FIG. 1. In which, the microlens layer 11 and the pattern layer 12 are respectively located on an upper surface and lower surface of the substrate layer 10. And a process for preparing the imaging film mainly includes the following steps:

(1) preparing the substrate layer by using a transparent high molecular polymer material (such as polyethylene terephthalate, briefly referred to as PET);

(2) coating a polymer on the upper surface of the substrate layer and shaping the polymer into the microlens layer; and (3) providing a convex ink pattern on the lower surface of the substrate layer to form the pattern layer.

An overall thickness of the imaging film prepared by using the above method for preparing may reach several hundreds of microns.

The overall thickness of the imaging film is generally large, which may result in that the imaging film is uneasy to be cut in thermoprinting.

Furthermore, in the implementation of this disclosure, the applicant found that at least the following defects exist in the prior art:

as the microlens array and the micro-pattern array in the imaging film in the prior art are periodically distributed, multiple images may be presented, and in many cases, people expect to obtain a unique image having a stereoscopically floating effect in various different application scenarios. Hence, it is necessary that a new technical solution is proposed, in which a more spectacular 3D visual effect is provided, being not affected by an angle of view of a viewer, drawing more eyes of the people, making the people obtained a shocking visual effect, being convenient in viewing, and enhancing weather resistance of the device.

SUMMARY OF THE INVENTION

On the basis of above, there is a need to provide an optical film, so as to solve at least one of the above problems.

This disclosure discloses an optical film, comprising a first polymer having a first surface and a second polymer having a second surface, the first surface and the second surface opposing to each other;

a microlens structure being formed on the first surface, the microlens structure comprising a number of micro-focusing units;

an accommodation structure being formed on the second surface, the accommodation structure accommodating a number of pattern structures imaging through the microlens structure;

a fusion portion being formed in a neighboring part between the first polymer and the second polymer, so that the microlens structure and the accommodation structure is an integral structure;

and the micro-focusing units and the pattern structures being adapted to each other, so that the optical film forms at least one image floating in the optical film when the optical film is viewed from a side of the pattern structures or a side of the micro-focusing units.

This disclosure discloses an optical film, comprising a polymer having a first surface and a second surface opposing to each other;

a microlens structure being formed on the first surface, the microlens structure comprising a number of micro-focusing units;

an accommodation structure being formed on the second surface, the accommodation structure accommodating a number of pattern structures imaging through the microlens structure;

the microlens structure and the accommodation structure being an integral structure;

and the micro-focusing units and the pattern structures being adapted to each other, so that the optical film forms at least one image floating in the optical film when the optical film is viewed from a side of the pattern structures or a side of the micro-focusing units.

Advantages of the embodiments of this disclosure exist in that:

(1) at least one floating graphic and text structure image is formed in a viewing area by associating the micro-focusing units on the first surface of the polymer with the pattern structures on the second surface of the polymer;

(2) a focal length of the micro-focusing units is more short, and a theoretical thickness of the film may be reduced to be one sixth of that of a transmission type, hence, micro-focusing units of larger apertures may be employed, which may not only reduce the thickness of the film, but also tolerance of the process is large, thereby breaking a limitation of design of a pattern of a transmission-type device, and making it possible to apply a complex micro-structure to a Moire amplifier;

(3) as in the optical film, it is needed to absolutely align the micro-focusing units with the micro graphic and text layer on the first surface and the second surface of the polymer, error requirements on such aspects as alignment process are more strict, and cost and technical difficulties greatly increase in simulating, thereby making the film had an optical anti-counterfeiting function;

(4) an effect of a security element using a reflective random Moire amplified image is not affected by environmental light, and its surfaces are smooth and flat, and may bear such pollution as sweat stains, and oil, etc., may be applied with adhesive glues, which are uneasy to drop off, and are relatively good in adaptation and weather resistance;

(5) the micro-focusing units may be, for example, reflective mirrors of lenses, and may have better light collection abilities and stereoscopic effects; and (6) as a substrate layer is omitted from the optical film, the optical film is reduced in thickness, and mechanical performance is not good, which makes the optical film easy to be cut in thermoprinting.

This disclosure discloses a 3D floating imaging optical film, comprising:

a transparent spacer layer having two surfaces opposing to each other;

a micro-focusing unit array layer provided on one of the surfaces of the transparent spacer layer, the micro-focusing unit array layer comprising a number of asymmetrically distributed micro-focusing units; and a micro graphic and text unit array layer provided on another surface of the transparent spacer layer opposite the micro-focusing unit array layer, the micro graphic and text unit array layer comprising a number of micro graphic and text units;

the micro-focusing unit array layer being adapted to the micro graphic and text unit array layer, so that the 3D floating imaging optical film is able to form one and only one floating image floating in the transparent spacer layer when the 3D floating imaging optical film is viewed from a side of the micro graphic and text units or a side of the micro-focusing units.

This disclosure discloses a micro optical imaging film, comprising:

a transparent spacer layer having a first surface and a second surface opposing to the first surface;

a micro-transmission focusing unit array layer provided on the first surface of the transparent spacer layer, the micro-transmission focusing unit array layer comprising at least two asymmetrically distributed micro-transmission focusing units; and a graphic and text variable layer provided on the second surface of the transparent spacer layer, the graphic and text variable layer comprising at least two micro graphic and text units, the micro graphic and text units comprising dot matrices having connected and/or disconnected states;

the micro graphic and text units being associated with the micro-transmission focusing units, so that the micro optical imaging film forms one and only one floating image at a side of the micro-transmission focusing units away from the micro graphic and text units via all dot matrices in the connected state.

In the embodiment of this disclosure, by setting the micro-transmission focusing units in the micro-transmission focusing unit array layer to be asymmetrically distributed setting the micro graphic and text units in the graphic and text variable layer to comprise at least two dot matrices having connected or disconnected states and associating the micro-transmission focusing units with the micro graphic and text units, a unique floating image of the graphic and text variable layer is formed in the viewing area, but not conventional multiple periodically distributed amplified micro graphic and text images, and different images may be formed by connecting different dot matrices, thereby achieving that an imaging film having a unique floating image may be provided for different application scenarios.

This disclosure discloses a micro optical imaging system, comprising a micro optical imaging film and a control device;

the micro optical imaging film comprising:

a transparent spacer unit having a first surface and a second surface opposing the first surface;

at least two asymmetrically distributed micro-transmission focusing units provided on the first surface of the transparent spacer unit; and at least two micro graphic and text units provided on the second surface of the transparent spacer unit, the micro graphic and text units comprising dot matrices having connected and/or disconnected states;

the micro optical imaging film forming one and only one floating image at a side of the micro-transmission focusing units away from the micro graphic and text units via all dot matrices in the connected state;

and the control device being configured to control connection, disconnection and/or display brightness of the dot matrices.

In the embodiment of this disclosure, by setting the micro-transmission focusing units in the micro optical imaging film to be asymmetrically distributed setting the micro graphic and text units to comprise dot matrices having connected or disconnected states and setting that the position coordinates of the micro graphic and text units are obtained by performing preset transform on the position coordinates of the micro-transmission focusing units, a unique floating image is formed in the viewing area, but not conventional multiple periodically distributed amplified micro graphic and text images, and different images may be formed by connecting different dot matrices, thereby achieving that an imaging film having a unique floating image may be provided for different application scenarios.

DETAILED DESCRIPTION OF THE INVENTION

Next, the technical solutions of the present disclosure will be described in details with reference to the drawings and the specific embodiments. It should be appreciated that those embodiments are just employed to illustrate the present disclosure, rather than limit the scope thereof. Various equivalent amendments to the present disclosure made by a person skilled in the art after reading the present disclosure should fall within the scope defined by the accompanied claims of the present application.

To be noted, when an element is described as being "disposed/provided" on another element, it may be located on another element directly, or there may be an intermediate element. When an element is described as being "connected to" another element, it may be connected to another element directly, or there may be an intermediate element. The terms "vertical", "horizontal", "upper", "lower", "left", "right", and the like used herein are just for the purpose of description, rather than indicating a unique embodiment.

Unless otherwise defined, all of the technical and scientific terms used herein are the same as those commonly understood by a person skilled in the technical field of the present disclosure. The terms used in the specification of the present application are just for the purpose of illustrating the specific embodiments, rather than limiting the present disclosure. The term "and/or" used herein includes any and all combinations of one or more related items listed.

Figure 2:
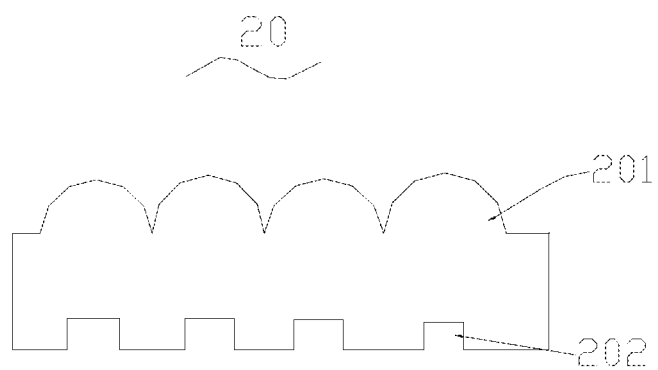
FIG. 2 is a schematic diagram of a structure of an optical film provided in an embodiment of this disclosure where no graphic and text structure is formed.
Figure 3:
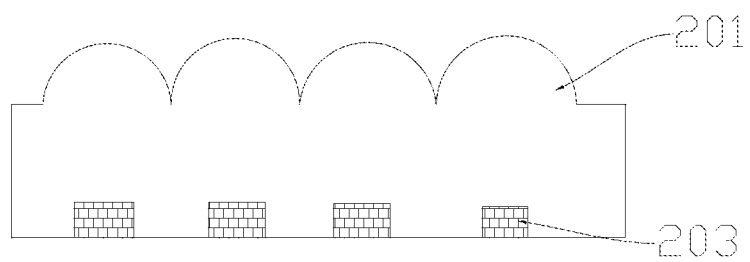
FIG. 3 is a schematic diagram of a structure of an optical film provided in the embodiment of this disclosure where pattern structures are formed.
Figure 4:
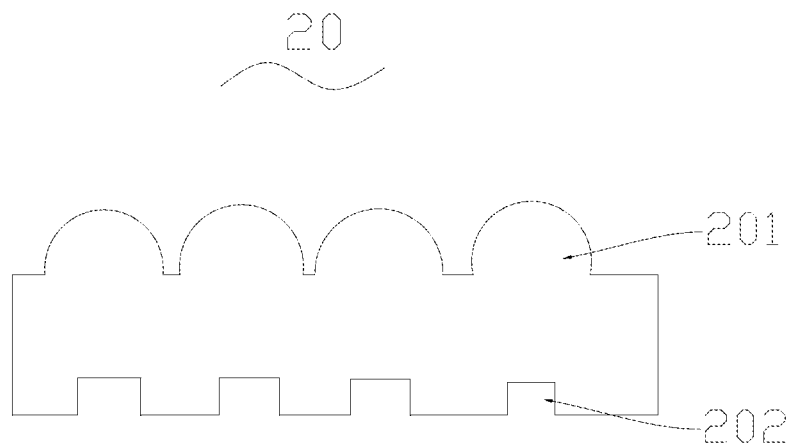
FIG. 4 is a schematic diagram of a structure of another optical film provided in an embodiment of this disclosure.

As shown in FIGS. 2 and 3, an embodiment of this disclosure provides an optical film 20, including a polymer having a first surface (an upper surface in the Figs.) and a second surface (a lower surface in the Figs.) opposing to each other, a microlens structure 201 being formed on the first surface, and an accommodation structure 202 being formed on the second surface, the accommodation structure 202 accommodating pattern structures 203 imaging through the microlens structure 201.

The polymer of the optical film may be a single polymer, and may also be a mixed polymer consisting of multiple single polymers not reacting to each other. A light transmittance of the polymer may be greater than 70%, that is, the polymer is transparent or visually displays transparency. The polymer may be a thermally curable resin and/or an actinically curable resin, such as a UV glue. The microlens structure 201 and the accommodation structure 202 may be respectively located on the first surface and the second surface opposing each other on a polymer layer constituted by the polymer, in which the polymer in the polymer layer may be uniformly distributed or nonuniformly distributed (addressing to density distribution in the polymer layer). And as the microlens structure 201 and the accommodation structure 202 are formed in the same polymer layer, there is no interface between the microlens structure 201 and the accommodation structure 202, that is, the microlens structure 201 and the accommodation structure 202 is an integral structure.

The microlens structure 201 may include a microlens array including one or more microlenses. There may be no gap between the multiple microlenses, so as to reduce an overall column of the polymer film. And there may be gaps between the multiple microlenses, so as to ensure integrity of the microlenses in cutting the polymer film, thereby ensuring subsequent imaging effects of the microlenses.

The microlens structure 201 may also include a number of asymmetrically distributed micro-focusing units. The micro-focusing units are asymmetrically distributed on the first surface of the polymer, so as to form a micro-focusing unit 11. It should be noted that the asymmetrically distributed appeared in this text refers to planes presented by multiple micro-focusing units on the first surface of the polymer do not have a mirror axis of symmetry, or a central axis of symmetry, etc., thereby making that the multiple micro-focusing units are not mirror symmetrically or central symmetrically distributed.

The accommodation structure 202 may include one or more grooves, or may include one or more micro-grooves (i.e. millimeter-to-micrometer-scale grooves), the grooves/micro-grooves being used for a filler to be filled, so as to form the pattern structures 203.

The pattern structures 203 contain patterns formed after a filler is filled. The filler may be a material between which and the polymer there is difference of reflectivity to light, including a colorant material, a metal material, or a conductive material, etc., such as ink. It should be noted that a color of the filler may be different from that of the polymer, so that people may obviously recognize patterns in the pattern structures in viewing imaging of the pattern structures. The pattern structures include one of the following or a combination thereof: a micro-printed pattern, a filling pigment, a surface microreliefed micro pattern of a dye, a micro pattern of a linear structure and a printed pattern.

The accommodation structure 202 (or the pattern structures 203) may be adapted to the microlens structure 201, including the accommodation structure 202 (or the pattern structures 203) being matched with a position where the microlens structure 201 is located, such as micro-patterns in the accommodation structure 202 being arranged facing directly microlenses in the microlens structure 201, so as to improve utilization of the polymer material. The match of the accommodation structure 202 (or the pattern structures 203) with the microlens structure 201 may also include the microlenses in the microlens structure 201 being arranged corresponding one by one to the micro-grooves in the accommodation structure (or micro-patterns in the pattern structures 203), which is advantageous to ensuring that each cut imaging film at least contains an integral microlens and a micro-groove (or a micro-pattern) when the imaging film is cut.

The pattern structures 203 may be located near a focal plane of the microlens structure 201 and image via the microlens structure 201, and an amplified image of the pattern structures 203 may be viewed from a side of the microlens structure 201 facing the pattern structures 203. In particular, each micro-pattern in the pattern structures 203 is located near a corresponding focal plane in the microlens structure 201, each micro-pattern may image via a corresponding micro-focusing unit, and an amplified image of a corresponding micro-pattern may viewed from another side of each micro-focusing unit. The focal plane may denote a plane passing focal points of the micro-focusing units (including front focal points or back focal points) and perpendicular to a main optical axis of the microlens array.

Figure 5:
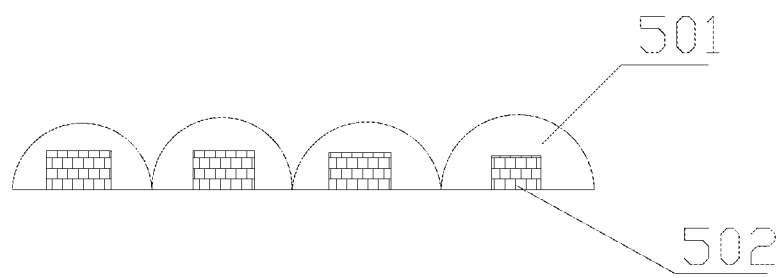
FIG. 5 is a schematic diagram of a structure of a further optical film provided in an embodiment of this disclosure.

A distance between a top of the microlens structure 201 and a top of the accommodation structure 202 (or the pattern structures 203) may be 2-150 microns. As shown in FIG. 5, in another embodiment, when a distance between the microlens structure 501 and the pattern structures 503 is very small, it may be deemed that the graphic and the text structures 503 are embedded in the microlens structure 501, as shown in FIG. 5. It can be seen from FIG. 5 that the text structures 503 are embedded in the microlens structure 501. The smaller the distance between the microlens structure and the pattern structures, the thinner the optical film is, which may not only save cost, but also make the optical film easy to be cut in thermoprinting.

Figure 1:
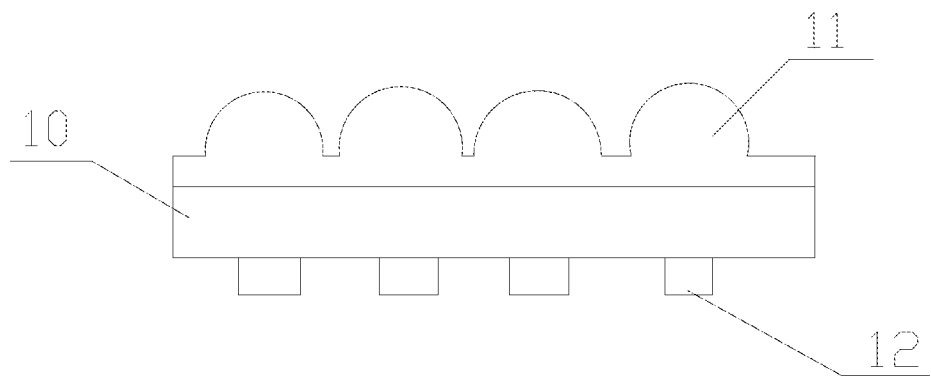
FIG. 1 is a schematic diagram of a structure of an imaging film in the prior art.

Referring to FIG. 1, the micro-focusing units and the pattern structures 203 are adapted to each other, so that the optical film forms an image floating in the optical film when the optical film is viewed from a side of the micro-focusing units.

Preferably, there is one and only one image or amplified image, and the amplified image is a single-channel pattern or a multi-channel pattern. It should be noted that "one and only one" does not mean one icon or one graphic and text in a conventional sense, such as a multi-channel pattern; the image must have an original image unit, and it may be understood that the image is formed from the original image unit by an optical device; the original image unit here is an integral graphic and text or a graphic and text capable of expressing an integral meaning; hence, "one and only one" here is defined according to the original image unit, and a formed image is only one original image unit, that is, "one and only one" here may not judge the number of images according to a connected domain.

The adaptation to each other is that position coordinates of the pattern structures 203 on the second surface may be obtained by transforming position coordinates of the corresponding micro-focusing units on the first surface, the transform including coordinate scaling transform or coordinate rotational transform, or a combination thereof.

Figure 13A:
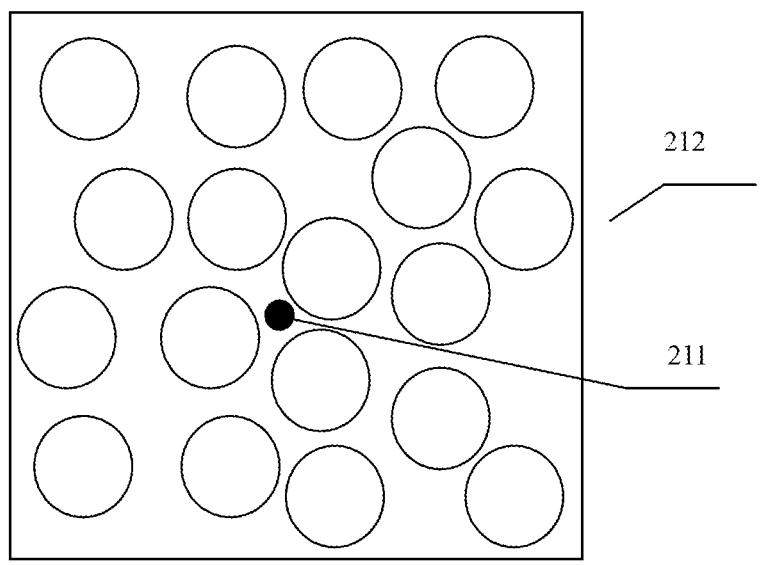
FIG. 13a is a schematic diagram of a structure of a micro-focusing unit in a floating imaging optical film provided in this disclosure.
Figure 13B:
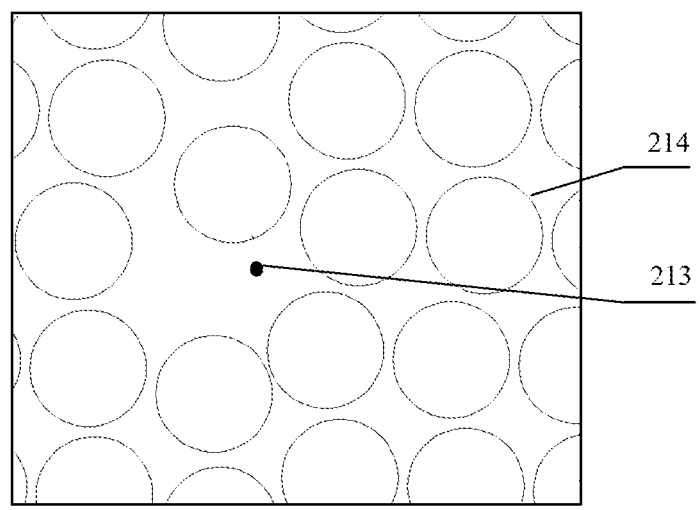
FIG. 13b is a schematic diagram of another structure of the micro-focusing unit in a floating imaging optical film provided in this disclosure.

Referring to FIGS. 13a and 13b, there is no symmetrical axis in distribution of the micro-focusing units in the first surface of the polymer. FIG. 13a shows a case of random distribution, and FIG. 13b shows a case where aperiodic distribution of the micro-focusing units are obtained by transforming square dot matrices according to functions $\xi_i = -x_{oi} - \arg \sin h(y_{oi})$, $\eta_i = y_{oi} - \arg \sin h(x_{oi})$ and taking coordinates of the dot matrices are centers of the micro-focusing units. A ratio of an area of a region where a micro-focusing reflective array is located to a total area is referred to as a duty cycle, and the larger the duty cycle, the higher a contrast of an obtained amplified graph is. Preferably, a total area occupied by the micro-focusing units is more than 60% of a total area of the first surface where they are located.

Figure 14A:
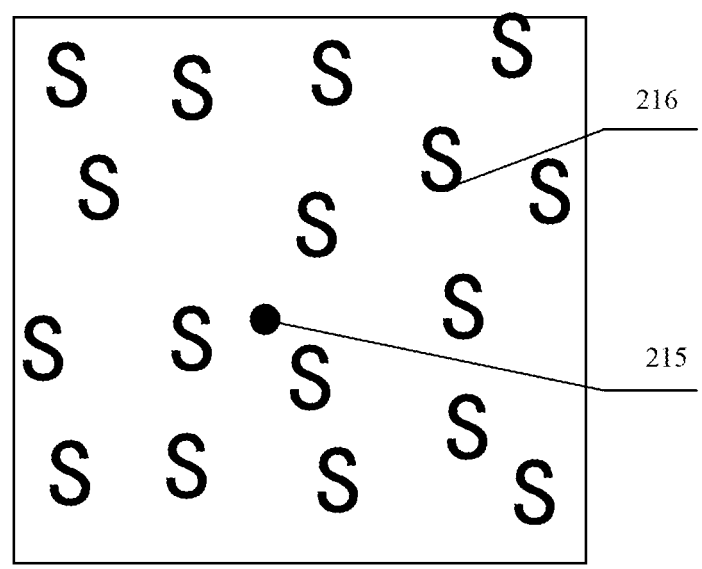
FIG. 14a is a schematic diagram of a structure of a graphic and text structure corresponding to the micro-focusing unit in FIG. 13a in this disclosure.
Figure 14B:
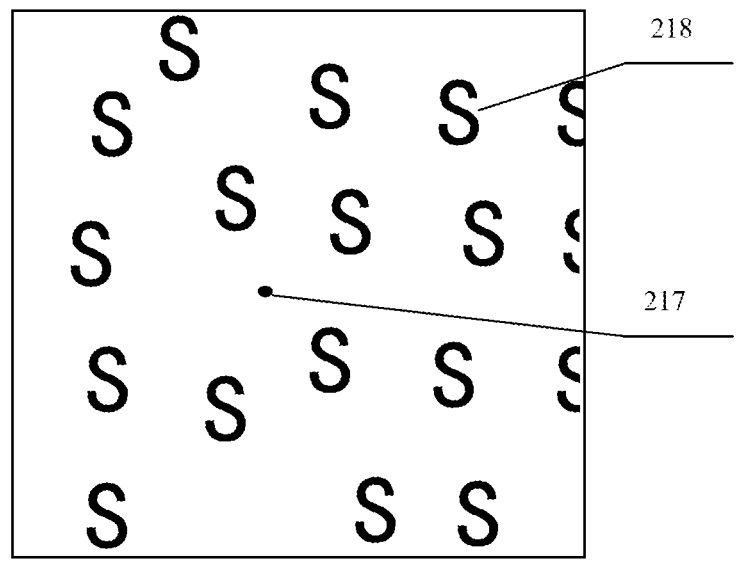
FIG. 14b is a schematic diagram of a structure of another graphic and text structure corresponding to the micro-focusing unit in FIG. 13b in this disclosure.

Referring to FIGS. 14a and 14b, FIG. 14a shows arrangement of the pattern structures obtained after the randomly distributed dot matrices in FIG. 13a are performed amplification transform $\xi_i = 0.99 x_{oi}$, $\eta_i = 0.99 y_{oi}$; where, $x_{oj}$ and $y_{oj}$ are the position coordinates of the micro-focusing units; there is no symmetrical axis in the distribution of the pattern structures in the second surface of the polymer, and the pattern structures are randomly distributed. FIG. 14b shows arrangement of the pattern structures obtained after the dot matrices of the micro-focusing units distributed according to the functions $\xi_i = -x_{oi} - \arg \sin h(y_{oi})$, $\eta_i = y_{oi} - \arg \sin h(x_{oi})$ are rotated counterclockwise by 2° (which may also be other values); wherein, $x_{oj}$ and $y_{oj}$ are the position coordinates of the micro-focusing units; there is no symmetrical axis in the distribution of the pattern structures in the second surface of the polymer, and the pattern structures are randomly distributed.

In this implementation, there is one and only one transform fixed point in the transform functions, which may ensure that only one unique amplified graphic and text structure image is presented. That is, in the above scaling transform or rotational transform, there is one and only one transform fixed point pair (a first surface coordinate value obtained based on the fixed point, and a second surface coordinate value obtained based on the fixed point), points 211-215 (as shown in FIGS. 13a and 14a) and points 213-217 (as shown in FIGS. 13b and 14b). In practical use, used coordinate transform includes but is not limited to a scaling transform and a rotational transform, or a combination thereof. The micro-focusing units have first positioning points corresponding to the fixed points of the functions in the plane where they are located, the pattern structures have second positioning points based on the fixed points and corresponding to the first positioning points in the plane where they are located, and the pattern structures correspond to the micro-focusing units one by one based on the first positioning points and the second positioning points. Of course, the functions of the transform of the position coordinates of the pattern structures and the position coordinates of the micro-focusing units may also be other functions having one and only one fixed point. As micro-focusing units are asymmetrically distributed on the surface of the polymer, it is ensured that the position coordinates of the pattern structures correspond to the position coordinates of the micro-focusing units one by one, thereby ensuring that the floating imaging optical film may only present one pattern, and multiple patterns will not occur. Although certain deflection and size variation will occur in the pattern during rotation of the film, clarity of the pattern may still be ensured, as no superimposition or another pattern will be produced.

In order that the pattern structures and the micro-focusing units reach better imaging effects, for example, a distance between the pattern structures and a focal plane of the micro-focusing units is less than or equal to 20% of a focal length focusing the micro-focusing units, and a total thickness of the optical film is between a half and three times of a radius of curvature of the micro-focusing units. In order that adaptation of the micro-focusing units is better, for example, an effective diameter of the micro-focusing units is greater than 20 microns and less than 1000 microns, or is 20 μm-500 μm, or is 55 nm-200 nm, or is 300 μm-450 μm. And for special demands in some fields, the effective diameter may be 550 μm-900 μm. For an even better imaging effect, for example, the focal length of the micro-focusing units is between 10 micron and 2000 microns, or is 20 μm-100 μm, or is 200 μm-450 μm, or is 550 μm-900 μm, or is 1050 μm-1500 μm. For the imaging film to be able to be used in more fields, for example, a total thickness of the 3D imaging optical film is less than 5000 microns. For example, if the film is designed for a high-end or ultrathin purpose, the film may adopt a structure with no substrate or with a thin substrate, and at this moment, the total thickness of the 3D imaging optical film is 20 μm-200 μm. And when it is used in a product with a relatively small volume and a requirement on thickness is not high, the total thickness of the 3D imaging optical film is 300 μm-500 μm, or 600 μm-1000 μm, or even more large, such as 1200 μm, 1300 μm, 1500 μm, 2000 μm, 2500 μm, 3500 μm, or 4500 μm.

It can be seen from the above description that the optical film provided by the embodiment of this disclosure may be of a one-layer film structure, the microlens structure and the accommodation structure are formed in the same polymer layer (i.e. forming an integral structure), and there is no substrate layer, which may achieve a goal of reducing the thickness of the optical film. And furthermore, as the optical film has no substrate layer, its mechanical performance is not good, which makes the optical film easy to be cut in thermoprinting.

The optical film in the embodiment of this disclosure is small in thickness, and its thickness may be less than decades of microns, even less than several microns, and the optical film is easy to be cut, hence, it is easy to be transfer printed.

In another embodiment, the pattern structures may be provided with a protective structures. The protective structures is used to protect the pattern structures, so as to prevent the patterns/micro-patterns in the pattern structures from being deformed and an imaging effect from being affected. The protective structures may include other transparent or visually transparent polymers producing no chemical reaction, such as a UV glue, and an OCA glue, etc.

It can be seen from the above description that the optical film provided by the embodiment of this disclosure may be of a one-layer film structure, the microlens structure and the accommodation structure are formed in the same polymer layer (i.e. forming an integral structure), and there is no substrate layer, which may achieve a goal of reducing the thickness of the optical film. And furthermore, as the optical film has no substrate layer, its mechanical performance is not good, which makes the optical film easy to be cut in thermoprinting.

The optical film in the embodiment of this disclosure is small in thickness, and its thickness may be less than decades of microns, even less than several microns, and the optical film is easy to be cut, hence, it is easy to be transfer printed.

Figure 6:
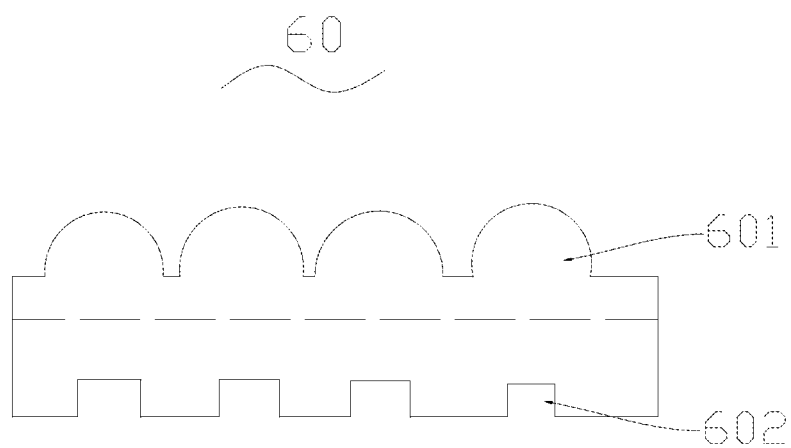
FIG. 6 is a schematic diagram of a structure of another optical film provided in an embodiment of this disclosure where no graphic and text structure is formed.
Figure 7:
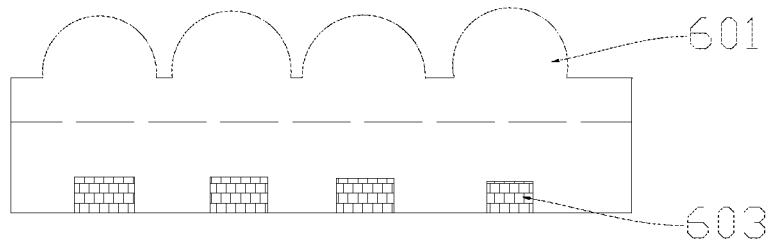
FIG. 7 is a schematic diagram of a structure of another optical film provided in the embodiment of this disclosure where pattern structures are formed.

The embodiment of this disclosure further provides another optical film 60, as shown in FIGS. 6 and 7. The optical film 60 may include a first polymer having a first surface and a second polymer having a second surface, the first surface and the second surface opposing to each other; a microlens structure 601 being formed on the first surface; an accommodation structure 602 being formed on the second surface, the accommodation structure being used to form pattern structures 603 imaging through the microlens structure 601.

Both the first polymer and the second polymer may be a single polymer, and may also be a mixed polymer consisting of multiple single polymers not reacting to each other. A light transmittance of both the first polymer and the second polymer may be greater than 70%, that is, the first polymer and the second polymer are transparent or visually display transparency. Both the first polymer and the second polymer may be a resin material, including a thermally curable resin and/or an actinically curable resin, such as a UV glue. A difference between refractive index of the first polymer and the second polymer may be less than 0.5, so as to ensure that people are not affected in viewing an imaging effect of an image in an imaging film.

A fusion portion is formed in a neighboring part between the first polymer and the second polymer, the neighboring part being a contact part between the first polymer and the second polymer when a model is used to squeeze the first polymer and the second polymer to form an initial structure of the microlens and an initial structure of the accommodation structure, and the fusion portion being a region formed by fusing the first polymer and the second polymer according to a preset proportion. The preset proportion may be N:M; wherein N and M are respective contents of the first polymer and the second polymer at a contact part of a neighboring part of the microlens structure 601 and the accommodation structure 602, values of which being 0-100%, exclusive of 0 and 100%. It should be noted that a content of the first polymer in the microlens structure 601 is 100%, and a content of the second polymer in the accommodation structure 602 is 100%. Hence, the microlens structure 601 and the accommodation structure 602 may be deemed as an integral structure, and there is no interface between the microlens structure and the accommodation structure, or there is no obvious boundary between layers on a section of the optical film or a boundary that is presented is a regular boundary. In this disclosure, the integral structure refers to an integral structure or an integrated structure that may be formed by curing or other processing means.

A difference between the optical film 60 provided by the embodiment of this disclosure and the optical film 20 shown in FIG. 2 exists in that the optical film 60 consists of two polymers, while the optical film 20 consists of one polymer. Description of the optical film 20 in the above embodiment may be referred to for description of the optical film 60, which shall not be described herein any further.

Figure 8:
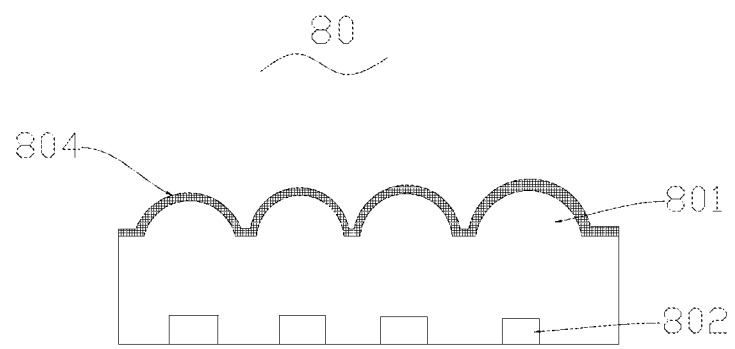
FIG. 8 is a schematic diagram of a structure of a further optical film (provided with a reflective structure) provided in an embodiment of this disclosure where no graphic and text structure is formed.
Figure 9:
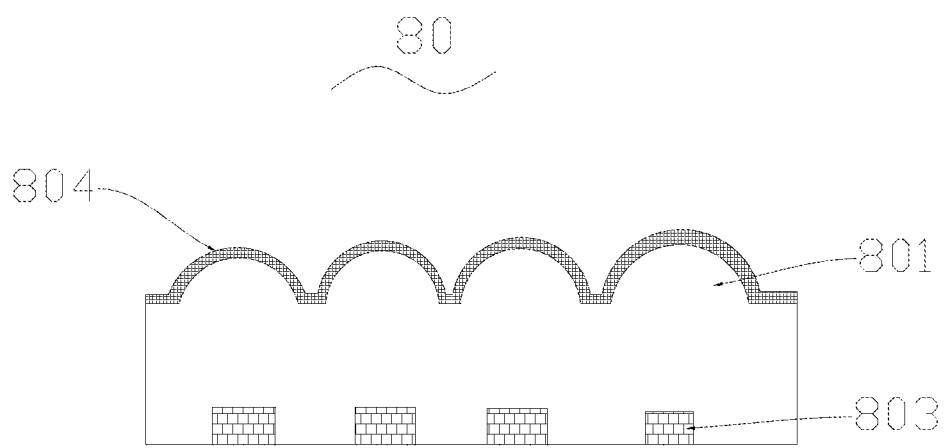
FIG. 9 is a schematic diagram of a structure of a further optical film (provided with a reflective structure) provided in an embodiment of this disclosure where pattern structures are formed.

As shown in FIGS. 8 and 9, the embodiment of this disclosure further provides still another optical film 80, including a polymer having a first surface and a second surface opposing each other, a microlens structure 801 being formed on the first surface and including a micro-focusing portion and a reflective structure 804 provided on a surface of the micro-focusing portion, an accommodation structure 802 being formed on the second surface and used to form pattern structures 803 imaging through the microlens structure 801.

The reflective structure 804 may be of a transparent material, or an opaque material, or a translucent material. A thickness of the reflective structure 804 may be between 0.02 micron and 5 microns. The reflective structure 804 may be of a single-layer dielectric layer, a multi-layer dielectric layer and a metal reflective structure, or may be of a multi-layer structure formed of a metal reflective structure and a dielectric layer. The micro-focusing units may include a cylindrical mirror, a spherical mirror, and an aspherical mirror, etc.

The reflective structure 804 is provided on the surface of the microlens structure 801, which makes that in practical use, a side where the pattern structures of the optical film are located is fitted to an practically-used product, and imaging of the pattern structures is viewed from the side where the pattern structures are located, thereby avoiding a problem that an effect of user experiences is affected due to irregularity of a side where the microlens structure is located when the imaging of the pattern structures is viewed from the side where the microlens structure is located, and being advantageous to improvement of user experiences.

Figure 10:
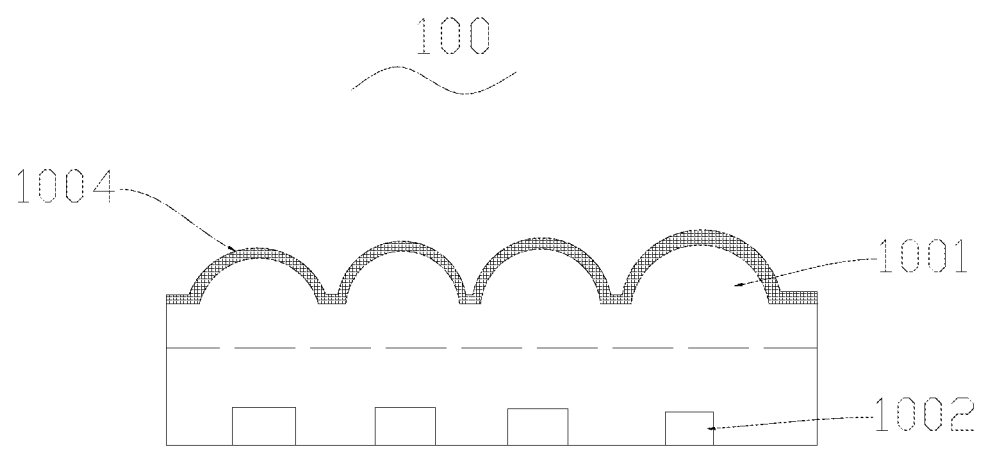
FIG. 10 is a schematic diagram of a structure of still another optical film (provided with a reflective structure) provided in an embodiment of this disclosure where no graphic and text structure is formed.
Figure 11:
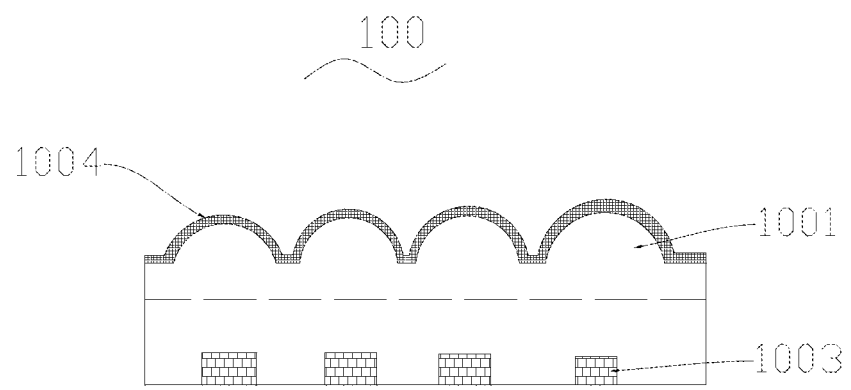
FIG. 11 is a schematic diagram of a structure of still another optical film (provided with a reflective structure) provided in an embodiment of this disclosure where pattern structures are formed.

As shown in FIGS. 10 and 11, the optical film 100 may include a first polymer having a first surface and a second polymer having a second surface, the first surface and the second surface opposing each other; a microlens structure 1001 being formed on the first surface and including a focusing portion and a reflective structure 1004 provided on a surface of the focusing portion opposing an accommodation structure; an accommodation structure 602 being formed on the second surface, the accommodation structure 1002 being formed on the second surface and used to form pattern structures 1003 imaging through the microlens structure 1001.

Figure 15:
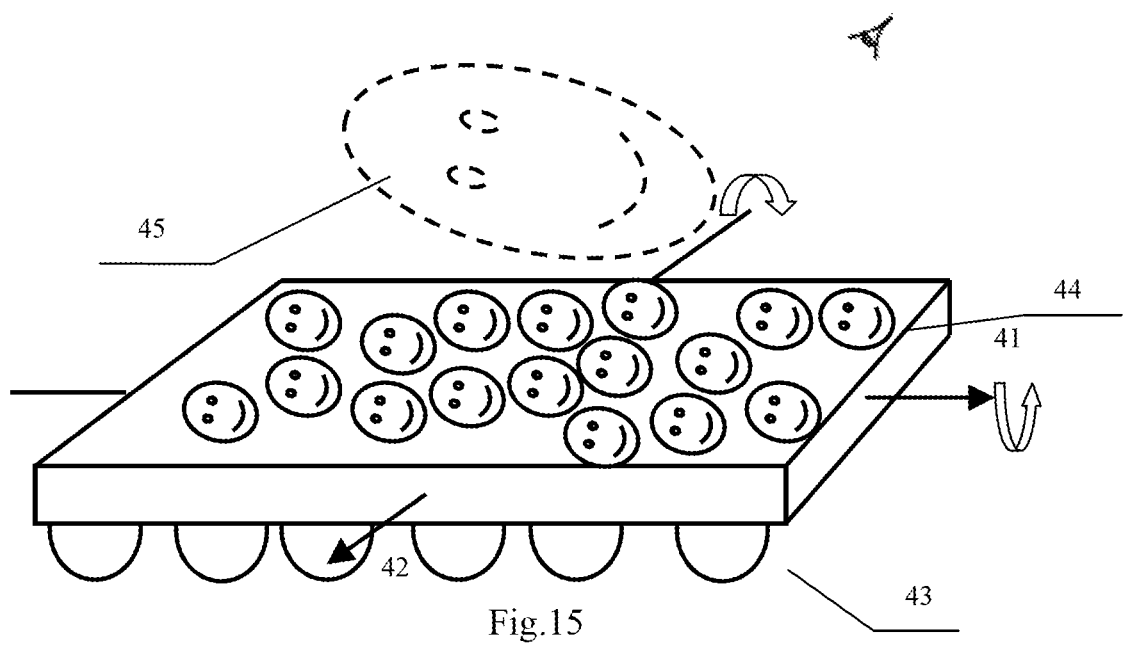
FIG. 15 is a schematic diagram of a visual effect of the floating imaging optical film in this disclosure.

In another embodiment, FIG. 15 is a schematic diagram of a visual effect of an optical film in this disclosure, as the optical film described in embodiment 1 of this disclosure, in which a micro graphic and text 44 hidden in a micro graphic layer may be amplified to an extent that may be distinguished by naked eyes directly. In viewing from a side of the second surface of the polymer, a viewer may see a unique amplified micro graphic and text 45 floating between the viewer and the second surface of the polymer. No matter the imaging film is rotated around a horizontal axis 41 or around a vertical axis 42, no other amplified micro graphic and text will enter into a viewing region. Furthermore, as a micro-focusing unit 43 that functions is located on the second surface of the polymer, it may be sealed by using a protective material. And when the first surface of the polymer is covered by such transparent substances as water, the imaging effect of the 3D optical film of this disclosure will not be affected.

Figure 16:
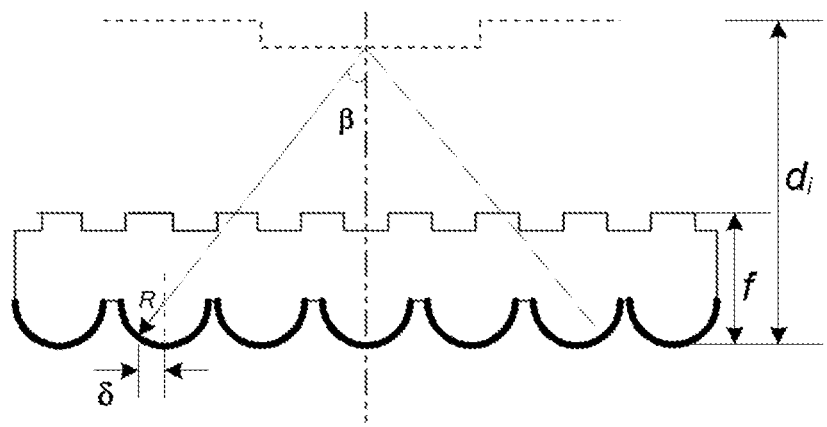
FIG. 16 is a schematic diagram of an implementation principle of the floating imaging optical film in this disclosure.

A principle of achieving a floating 3D amplified image by the structure provided in this disclosure is as shown in FIG. 16. Let the radius of curvature of the micro-focusing units be R, the focal length be f, and a height of the floating image of the pattern structures be di, according to a geometric relationship in FIG. 16, tan $$\beta = \frac{x_{MLA} + \delta}{d_i} = \frac{x_{MLA} - x_{MPA}}{f - R_1} = \frac{\delta}{R},$$

wherein $x_{MLA}$ denotes a coordinate value of the micro-focusing units, and $x_{MPA}$ denotes a coordinate value of the pattern structures, the height of the floating image may be calculated as:

$$d_i = \frac{f - R}{1 - \frac{x_{MPA}}{x_{MLA}}} + R.$$

When $$\frac{x_{MPA}}{x_{MLA}} > 1,$$

an amplified floating graphic and text structure image will be obtained. In this disclosure, a micro graphic and text image having a dynamic stereoscopic floating effect will be obtained by performing domain scaling transform or rotational transform on the position coordinates of the micro-focusing units.

Figure 12:
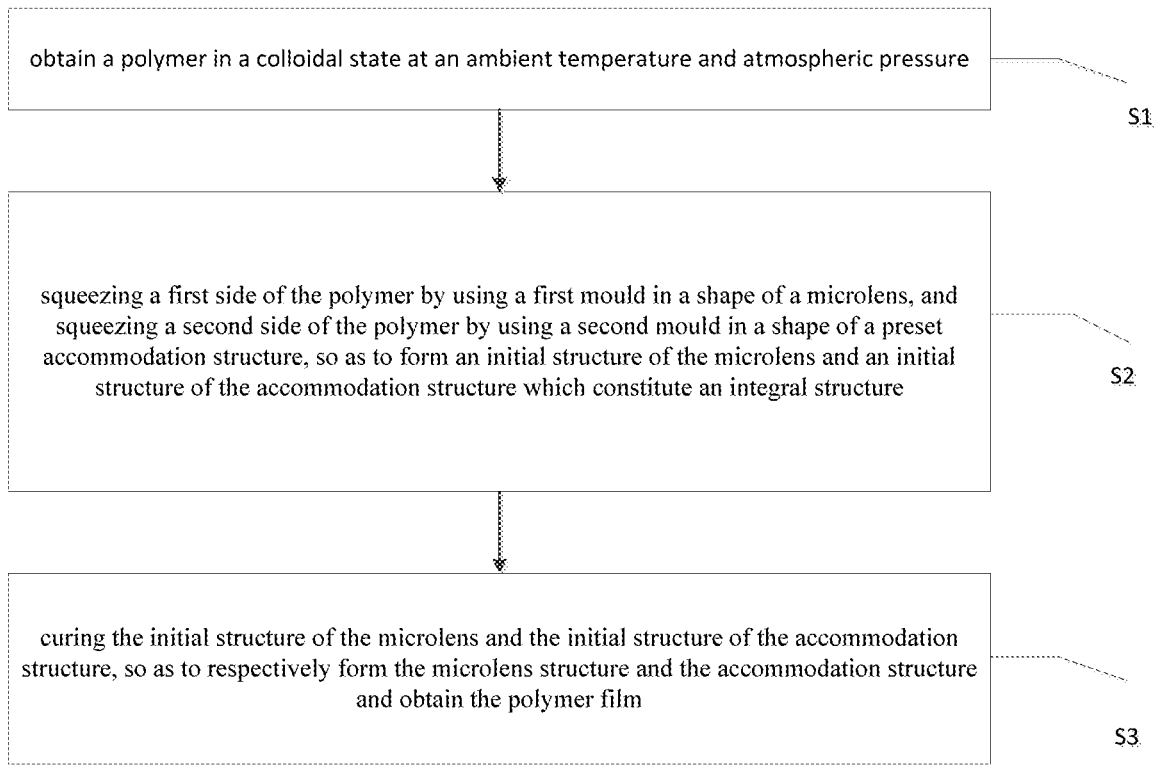
FIG. 12 is a flowchart of a method for preparing an optical film provided in an embodiment of this disclosure.

In another implementation, a remained part of the first surface of the polymer or the second surface of the polymer is provided with the following: a holographic anti-counterfeiting unit, a Fresnel relief structure unit, an optical transform unit, a sub-wavelength micro structure unit, a motion-sensing optical transform unit, or a printed pattern, a dielectric layer, a metal layer, or is coated with an ink, a fluorescer, a magnetic material, a phosphoric material, a selective absorbing material, or has a micronano structure. The embodiment of this disclosure further provides a method for preparing a polymer film, as shown in FIG. 12. The method includes:

step 1: obtain a polymer in a colloidal state at an ambient temperature and atmospheric pressure;

the polymer may be one or two polymers, and each polymer may be a single polymer, such as a curable resin, or a UV glue, etc., and may also be a mixed polymer consisting of multiple single polymers not reacting to each other;

the polymer may be obtained by using a method in the prior art, which shall not be described herein any further.

step 2: squeezing a first side of the polymer by using a first mould in a shape of a microlens, and squeezing a second side of the polymer by using a second mould in a shape of a preset accommodation structure, so as to form an initial structure of the microlens and an initial structure of the accommodation structure which constitute an integral structure; wherein, the first surface and the second surface oppose to each other;

after obtaining the polymer, the first side of the polymer is squeezed by using the first mould in a shape of a microlens, so as to form the initial structure of the microlens, and the second side of the polymer is squeezed by using the second mould in a shape of a preset accommodation structure, so as to form the initial structure of the accommodation structure; the initial structure of the microlens and the initial structure of the accommodation structure form an integral structure during squeeze; the microlens structure may be a microlens array containing one more microlenses, and the initial structure of the accommodation structure may contain one or more grooves;

the squeezing the first side of the polymer by using the first mould in a shape of a microlens so as to form an initial structure of the microlens and squeezing the second side of the polymer by using the second mould in a shape of a preset accommodation structure so as to form an initial structure of the accommodation structure may be simultaneously squeezing the first side and the second side of the polymer by using the first mould in a shape of a microlens and the second mould in a shape of a preset accommodation structure so as to form the initial structure of the microlens and the initial structure of the accommodation structure, may be first squeezing the first side of the polymer by using the first mould in a shape of a microlens, so as to form an initial structure of the microlens, and then in a first preset time interval, squeezing the second side of the polymer by using the second mould in a shape of a preset accommodation structure, so as to form an initial structure of the accommodation structure, or may be first squeezing the second side of the polymer by using the second mould in a shape of a preset accommodation structure, so as to form an initial structure of the accommodation structure, and then in the first preset time interval, squeezing the first side of the polymer by using the first mould in a shape of a microlens, so as to form an initial structure of the microlens; the first preset time interval may be set according to an actual operational situation;

when the number of the polymer is one, the first side and the second side of the polymer may be squeezed by using the first mould and the second mould, or the first side and the second side of the polymer may be squeezed in the first preset time interval so as to form the initial structure of the microlens and the initial structure of the accommodation structure; when the number of the polymer is two, for example, a first polymer and second polymer, the first side of the polymer may be squeezed by using the first mould, and at the same time or in the first preset time interval, the second side of the polymer may be squeezed by using the second mould; and neighboring parts between the first polymer and the second polymer contact each other to form the fusion portion, and form the initial structure of the microlens and the initial structure of the accommodation structure;

step 3: curing the initial structure of the microlens and the initial structure of the accommodation structure, so as to respectively form the microlens structure and the accommodation structure and obtain the polymer film;

after forming the initial structure of the microlens and the initial structure of the accommodation structure, the initial structure of the microlens and the initial structure of the accommodation structure may be cured, so as to respectively form the microlens structure and the accommodation structure; the curing the initial structure of the microlens and the initial structure of the accommodation structure may include simultaneously curing the initial structure of the microlens and the initial structure of the accommodation structure, may be first curing the initial structure of the microlens, and then curing the initial structure of the accommodation structure when the initial structure of the microlens is not completely cured, or may be first curing the initial structure of the accommodation structure, and then curing the initial structure of the microlens when the initial structure of the accommodation structure is not completely cured;

the curing the initial structure of the microlens and the initial structure of the accommodation structure may be thermally curing or actinically curing the initial structure of the microlens and the initial structure of the accommodation structure directly, an may also be curing the initial structure of the microlens and the initial structure of the accommodation structure by the first mould and/or the second mould by using a radiation source or a heat source; for example, when the polymer is a UV glue, it is illuminated by ultraviolet light to cure the initial structure of the microlens and the initial structure of the accommodation structure, so as to form the microlens structure and the accommodation structure.

In the above embodiments, adhesion of the first mould to the polymer is greater than adhesion of the second mould to the polymer, so that the polymer is not separated from the first mould when the second mould is separated, thereby preventing subsequent filling materials into the groove structures from being affected.

It can be seen from the above steps that the microlens structure and the accommodation structure in the method for preparing a polymer film provided in the embodiment of this disclosure may be shaped in one step and may be cured at the same time with no need of preparation of a substrate layer, thereby lowering the thickness of the polymer film; and furthermore, the method is simple in processing, saves materials, lowers cost, and is suitable to industrialized manufacture.

In another embodiment, in order that the polymer film may be used for imaging, the method may further include:

step 4: filling a filler into the accommodation structure to form the pattern structures, the filler being different from the polymer with respect to refractive index;

after obtaining the polymer film, the filler may filled into the accommodation structure and may be cured by drying or firing, so as to form the pattern structures; and the filler may be different from the polymer with respect to refractive index, and its color may also be different from a color of the polymer, so as to be convenient to viewing.

In another embodiment, in order that pattern imaging may be viewed at the side of the pattern structures so as to improve an effect of user experiences, the method for preparation may further include:

step 5: forming a reflective structure on the surface of the microlens structure;

after forming the microlens structure, the reflective structure may be formed on the surface of the microlens structure by ink jet printing, spin-coating, evaporating, magnetron sputtering, and electroplating, etc.

In another embodiment, in order that the prepared film is convenient to use, the method for preparation may further include:

step 6: cutting the polymer film into film units of preset sizes;

the film unit may at least contain an integral microlens and groove or pattern.

It should be noted that an order of execution of this step and step 4 is not limited.

The above steps shall be further explained below with reference to a practical method for preparation.

In a particular process for preparing the film, the opposing sides of the polymer may be squeezed by using a press fitting device. The press fitting device may include a first roller and a second roller in parallel with each other and having a preset spacing distance therebetween, the first mould being provided on a peripheral surface of the first roller, and the second mould being provided on a peripheral surface of the second roller. The first roller and the second roller may be vertically arranged opposite each other, and may also be horizontally arranged opposite each other. The first roller and the second roller may be opposite each other, and may also be diagonal each other. The first mould and the second mould may be respectively nested on the first roller and the second roller, or may respectively be etched in the first roller and the second roller.

When the first roller and the second roller are vertically arranged opposite each other, the polymer is injected into between the two rollers, and the polymer vertically passes the two rollers under action of gravity force and friction force between the rollers, thereby forming the initial structure of the microlens and the initial structure of the accommodation structure. Then, during or after the initial structure of the microlens and the initial structure of the accommodation structure are formed, the two rollers are heated at the same time, or one of them is heated, so as to form the microlens structure and the accommodation structure by curing. It should be noted that the preset spacing distance between the two rollers may be adjusted according to a preset thickness between the microlens structure and the accommodation structure, so as to ensure that when the first surface and the second surface are in different polymers, the two polymers form the fusion portion in a process of rolling and squeezing by the rollers, hence, there will exist no interface between the microlens structure and the accommodation structure shaped by curing.

Furthermore, the press fitting device may further include a cutting tool, which cuts the polymer film after the polymer film containing the microlens structure and the accommodation structure is obtained, so as to be convenient to subsequent use.

When the first roller and the second roller are horizontally arranged opposite each other, a pushing force may be applied to cause the polymer horizontally passes the two rollers, so as to form the initial structure of the microlens and the initial structure of the accommodation structure; and the two rollers are heated, so that the formed initial structure of the microlens and initial structure of the accommodation structure are cured at the same time to respectively form the microlens structure and the accommodation structure. A particular process of execution of the first roller and the second roll when they are vertically arranged may be referred to for a particular process of execution of this manner, which shall not be described herein any further.

A 3D floating imaging optical film, including: a transparent spacer layer having two surfaces opposite each other; a micro-focusing unit array layer provided on one of the surfaces of the transparent spacer layer, the micro-focusing unit array layer including a number of irregularly distributed micro-focusing units; and a micro graphic and text unit array layer provided on another surface of the transparent spacer layer opposite the micro-focusing unit array layer, the micro graphic and text unit array layer including a number of micro graphic and text units; the micro-focusing unit array layer being adapted to the micro graphic and text unit array layer, so that the 3D floating imaging optical film is able to form one and only one floating image floating in the transparent spacer layer when the 3D floating imaging optical film is viewed from a side of the micro graphic and text units or a side of the micro-focusing units.

A 3D imaging optical film, including: a transparent spacer layer having two surfaces opposite each other; a micro reflective focusing unit array layer provided on one of the surfaces of the transparent spacer layer, the micro reflective focusing unit array layer including a number of irregularly distributed micro reflective focusing units; and a micro graphic and text unit array layer provided on another surface of the transparent spacer layer opposite the micro reflective focusing unit array layer, the micro graphic and text unit array layer including a number of micro graphic and text units; the micro reflective focusing unit array layer being adapted to the micro graphic and text unit array layer, so that the 3D imaging optical film is able to form one and only one floating image floating in the transparent spacer layer when the 3D imaging optical film is viewed from a side of the micro graphic and text units, the floating image formed by the 3D imaging optical film being a single-channel pattern or a multi-channel pattern.

Figure 17A:
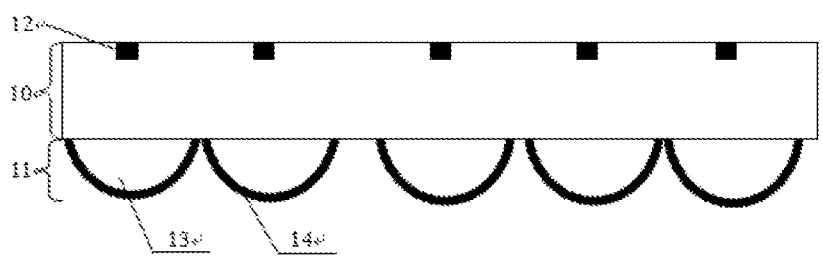
FIG. 17a is a schematic diagram of a structure of the 3D floating imaging optical film in this disclosure.

Referring to FIGS. 17a and 15, a 3D floating imaging optical film, including: a transparent spacer layer 10 having a first surface (a lower surface of the transparent spacer layer 10 in the figures) and an oppositely disposed second surface (an upper surface of the transparent spacer layer 10 in the figures); a number of micro-focusing units disposed on the first surface of the transparent spacer layer 10, the micro-focusing units being asymmetrically distributed on the first surface of the transparent spacer layer, thereby forming the micro-focusing unit array layer 11; it should be noted that the asymmetry appeared in this text refers to planes presented by multiple micro-focusing units on the first surface of the transparent spacer layer 10 do not have a mirror axis of symmetry, or a central axis of symmetry, etc., thereby making that the multiple micro-focusing units are not mirror symmetrically or central symmetrically distributed; the micro-focusing units 13 further including a micro-focusing portion and a reflective structure 14 provided on a lower surface of the micro-focusing portion; and a number of micro graphic and text units 12 disposed on the second surface of the transparent spacer layer and forming a micro graphic and text unit array layer. Viewed from a side of the first surface of the transparent spacer layer 10, the imaging film forms a floating amplified image 45 floating between the first surface of the transparent spacer layer 10 and the viewer, the number of the amplified image 45 being one and only one, and the amplified image 45 being formed by the micro graphic and text units 44 after being amplified by the micro-focusing unit array layer 43. When the imaging film is rotated around an axis 41 or an axis 42 or is tilted side to side or forward and backward, no other image 45 of the amplified micro graphic and text units will enter into a viewing region.

In another implementation, when the 3D floating imaging optical film does not include a reflective structure, there will be one and only one floating image floating in the transparent spacer layer may be formed in viewing from a side of the micro-focusing unit array layer.

Referring to FIG. 17a, the transparent spacer layer 10 is actually a substrate, which may be such a resin as PET, PVC, or PMMA, etc.; wherein, the micro graphic and text unit 12 is embedded in the transparent spacer layer 10, or a curable resin is provided on a surface of the transparent spacer layer 10, and the micro graphic and text unit 12 may be embedded in the curable resin. Of course, the micro graphic and text unit 12 may also be adhered to the surface of the transparent spacer layer 10 via an adhesion layer. And the microlens unit array layer 11 is formed on the surface of the transparent spacer layer 10, and may also be adhered to the surface of the transparent spacer layer 10 via an adhesion layer.

Figure 17B:
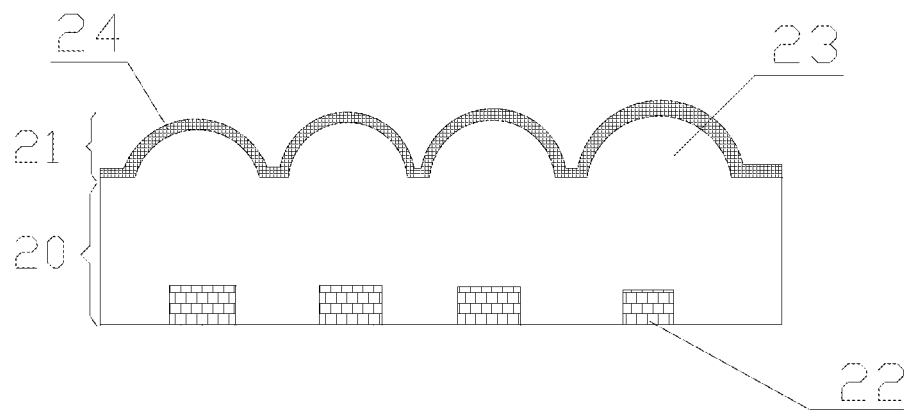
FIG. 17b is a schematic diagram of another structure of the 3D floating imaging optical film in this disclosure.

Referring to FIGS. 17b and 15, a 3D floating imaging optical film of another structure, including: a transparent spacer layer 20 having a first surface and an oppositely disposed second surface; a number of micro-focusing units disposed on the first surface of the transparent spacer layer 20, the micro-focusing units being asymmetrically distributed on the first surface of the transparent spacer layer, thereby forming the micro-focusing unit array layer 21. The 3D floating imaging optical film further includes a micro-focusing portion and a reflective structure 24 provided on a surface of the micro-focusing portion; and a number of micro graphic and text units 22 disposed on the second surface of the transparent spacer layer 20 and forming a micro graphic and text unit array layer. Viewed from a side of the first surface of the transparent spacer layer 20, the imaging film forms a floating amplified image 45 floating between the first surface of the transparent spacer layer 20 and the viewer, the number of the amplified image 45 being one and only one, and the amplified image 45 being formed by the micro graphic and text units 44 after being amplified by the micro-focusing unit array layer 43. When the imaging film is rotated around an axis 41 or an axis 42 or is tilted side to side or forward and backward, no other image 45 of the amplified micro graphic and text units will enter into the viewing region.

Referring to FIG. 17b, the micro-focusing units 23, the transparent spacer layer 20 and the micro graphic and text units 22 are integral, that is, the micro-focusing units 23, the micro graphic and text units 22 and the transparent spacer layer 20 are formed by one time of curing. As there exists no substrate, such a 3D floating imaging optical film is thinner than that shown in FIG. 17a. Wherein, the micro graphic and text units 22 are embedded in the transparent spacer layer 20, the transparent spacer layer 20 at this moment is a curable resin, and the micro-focusing units 23 and the micro graphic and text units 22 may be directly formed on a surface of the resin by a mould by shaping, curing and filling. The micro graphic and text units 22 may be patterns of grooves formed on the second surface of the transparent spacer layer 20, and may also be formed by filling one of a resin, a dying material, a coloring material, a metal, or any combination thereof, having a reflective index difference therebetween, into the grooves.

Figure 17C:
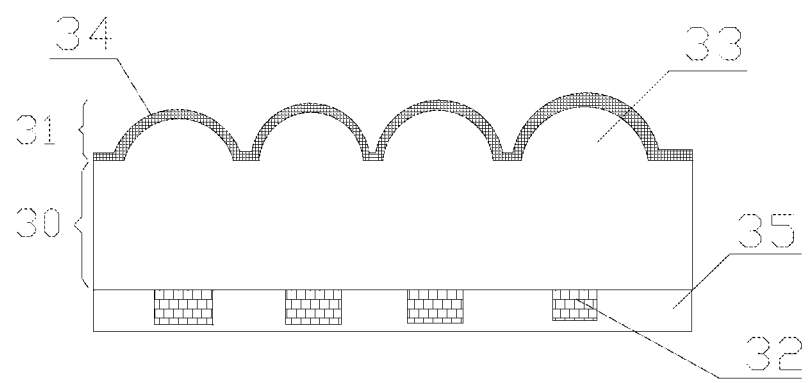
FIG. 17c is a schematic diagram of a further structure of the 3D floating imaging optical film in this disclosure.

Referring to FIGS. 17c and 15, a 3D floating imaging optical film, including: a transparent spacer layer 30 having a first surface (an upper surface of the transparent spacer layer 30 in the figures) and an oppositely disposed second surface (a lower surface of the transparent spacer layer 30 in the figures); a number of micro-focusing units disposed on the first surface of the transparent spacer layer 30, the micro-focusing units being asymmetrically distributed on the first surface of the transparent spacer layer, thereby forming the micro-focusing unit array layer 31. The micro-focusing units 33 include a micro-focusing portion and a reflective structure 34 provided on the upper surface of the micro-focusing portion; and a number of micro graphic and text units 32 disposed on the second surface of the transparent spacer layer 30 and forming a micro graphic and text unit array layer. Viewed from a side of the second surface of the transparent spacer layer 30, the imaging film forms a floating amplified image 45 floating between the second surface of the transparent spacer layer 30 and the viewer, the number of the amplified image 45 being one and only one, and the amplified image 45 being formed by the micro graphic and text units 44 after being amplified by the micro-focusing unit array layer 43. When the imaging film is rotated around an axis 41 or an axis 42 or is tilted side to side or forward and backward, no other image 45 of the amplified micro graphic and text units will enter into the viewing region. Referring to FIG. 17c, the micro-focusing units 33, the transparent spacer layer 30 and the micro graphic and text units 32 are integral, that is, the micro-focusing units 33 and the micro graphic and text units 32 are directly formed on the transparent spacer layer 30. As there exists no substrate, such a 3D floating imaging optical film is thinner than that shown in FIG. 17a. Wherein, the micro graphic and text units 32 are convexly disposed on the transparent spacer layer 30, the transparent spacer layer 30 at this moment is a curable resin, and the micro-focusing units 33 are formed directly on a surface of the curable resin, and then cured and shaped. The micro graphic and text units 32 may be formed on the second surface of the transparent spacer layer 30 by ink jet printing, silk-screen printing, photolithography, or relief; wherein, a material forming the micro graphic and text units 32 is one or more of a resin, a dying material, a coloring material, a metal, or any combination thereof, having a reflective index difference therebetween. The 3D floating imaging optical film is further provided with a guard layer 35 on its second surface, and the guard layer 35 may also be an adhesion layer. Hence, the micro graphic and text units may be well protected. At this moment, a thickness of such a film is greater than that of the film shown in FIG. 17b. One side of the micro graphic and text units shown in FIGS. 17a and 17b may be provided with a guard layer, and the guard layer may have a function of an adhesion layer. In FIGS. 17a, 17b and 17c, not only one side of the micro graphic and text units may be provided with a guard layer, but also one side of the micro-focusing units may be provided with a guard layer; wherein, the guard layer may have a function of an adhesion layer. The guard layer may include transparent or visually transparent polymers producing no chemical reaction, such as a UV glue, and an OCA glue, etc.

Referring to FIGS. 17a, 17b and 17c, the micro-focusing units are randomly or aperiodically distributed on the first surface of the transparent spacer layer, and a total thickness of the micro-focusing units, the transparent spacer layer and the micro graphic and text units is between a half and three times of a radius of curvature of the micro-focusing units. The reflective structures 14, 24 and 34 may be a single-layer dielectric layer, or a multi-layer dielectric layer, or a metal reflective structure, or may be a multi-layer structure formed of a metal reflective structure and a dielectric layer, and may have a thickness of 20 nm-5 µm. The reflective structures 14, 24 and 34 may be provided on the surface of the micro-focusing unit array layer, which makes that in practical use, a side where the pattern structures of the floating imaging optical film are located is fitted to an practically-used product, and imaging of the graphic and text units is viewed from the side where the graphic and text units are located, thereby avoiding a problem that an effect of user experiences is affected due to irregularity of a side where the micro-focusing unit array layer is located when the imaging of the graphic and text units is viewed from the side where the micro-focusing unit array layer is located, and being advantageous to improvement of user experiences.

Referring to FIGS. 17a, 17b, 17c and 15, the graphic and text units may also be constituted by at least two of a micro-printed pattern, a surface microreliefed micro pattern of a filling pigment or dye, a micro pattern of a linear structure, a printed pattern, and a surface microreliefed micro pattern of a filling pigment or dye and a micro pattern of a linear structure. Wherein, the graphic and text unit array layer forms an image by amplifying via the micro-focusing unit array layer, the number of the image or amplified image being one and only one, and the amplified image being a single-channel pattern or a multi-channel pattern. It should be noted here that "one and only one" does not mean one icon or one graphic and text in a conventional sense, such as a multi-channel pattern; the image must have an original image unit, and it may be understood that the image is formed from the original image unit by an optical device; the original image unit here is an integral graphic and text or a graphic and text capable of expressing an integral meaning; hence, "one and only one" here is defined according to the original image unit, and a formed image is only one original image unit, that is, "one and only one" here may not judge the number of images according to a connected domain.

In one of the embodiments, the position coordinates of the micro graphic and text units are adapted to those of the micro-focusing units each other, the adaptation to each other being that the position coordinates of the pattern structures on the second surface are obtained by transforming position coordinates of the micro-focusing units on the first surface, the transform including coordinate scaling transform or coordinate rotational transform, or a combination thereof, and previous description may be referred to for details, which shall not be described herein any further.

In order that the micro graphic and text units and the micro-focusing units achieve better imaging effects, parameters of the micro graphic and text units and the micro-focusing units may be configured according to what is described above, which shall not be described herein any further. Furthermore, the micro-focusing units may include a cylindrical mirror, a spherical mirror and an aspherical mirror.

Furthermore, a remained part of the first surface of the transparent spacer layer or the second surface of the transparent spacer layer is provided with the following: a holographic anti-counterfeiting unit, a Fresnel relief structure unit, an optical transform unit, a sub-wavelength micro structure unit, a motion-sensing optical transform unit, or a printed pattern, a dielectric layer, a metal layer, or is coated with an ink, a fluorescer, a magnetic material, a phosphoric material, a selective absorbing material, or has a micronano structure.

Embodiment 1

Referring to FIG. 17a, a schematic diagram of a structure of a 3D floating imaging optical film is shown. The film is of a structure having three layers: a transparent spacer layer 10, a 2D micro-focusing unit array layer (or a micro-focusing unit array) 11 and a micro graphic and text unit layer (micro graphic and text units) 12, micro-focusing units 13 and micro reflective units (or a micro reflective structure) 14 being on the 2D micro-focusing unit array layer 11.

A thickness of the transparent spacer layer 10 is between 10 microns and 5000 microns, and preferably less than 1000 microns. A material of the transparent spacer layer may be PC, PVC, PET, PMMA, a UV sensitive curing glue, a glass, or BOPP, etc., and preferably PET and a UV sensitive curing glue.

The micro-focusing units 13 and the micro reflective units 14 focus light incident from the second surface of the transparent spacer layer on the micro graphic and text unit layer 12. The micro-focusing units 13 may be refractive and reflective units or diffractive and reflective units. When refractive and reflective units are used, such as a 1D cylindrical mirror, a 2D spherical mirror, or an aspherical mirror, their focal lengths are halves of their radii of curvature, and sizes of apertures are between 10 microns and 1000 microns, and preferably between 25 microns and 500 microns. A numerical aperture of the micro lens is 0.1-4.0, and preferably less than 2.0.

A material of the micro-focusing units 13 may be PC, PVC, PET, PMMA, a UV sensitive curing glue, a glass, or BOPP, etc., and preferably PET and a UV sensitive curing glue. A material of the micro reflective units 14 may be a single-layer dielectric layer, or a multi-layer dielectric layer, or a metal reflective structure, or may be a multi-layer structure formed of a metal reflective structure and a dielectric layer.

The graphic and text layer 12 may be constituted by at least two of a micro-printed pattern, a surface microreliefed micro pattern of a filling pigment or dye, a micro pattern of a linear structure, a printed pattern, and a surface microreliefed micro pattern of a filling pigment or dye and a micro pattern of a linear structure.

Embodiment 2

Referring to FIG. 15, a schematic diagram of a visual effect of a 3D stereoscopic imaging optical film is shown, such as the optical film described in Embodiment 1 of this disclosure, in which a micro graphic and text 44 hidden in the micro graphic and text layer is amplified to directly distinguished by eyes. Viewing from a side of the second surface of the transparent spacer layer, the viewer may see a unique amplified micro graphic and text 45 floating between the viewer and the second surface of the transparent spacer layer. No matter the imaging film is rotated around a horizontal axis 41 or around a vertical axis 42, no other amplified micro graphic and text will enter into the viewing region. Furthermore, as a micro-focusing unit 43 that functions is located on the second surface of the transparent spacer layer, it may be sealed by using a protective material. And when the first surface of the transparent spacer layer is covered by such transparent substances as water, the imaging effect of the 3D optical film of this disclosure will not be affected.

Embodiment 3

In order to obtain the 3D optical imaging film based on the above technical solutions, this disclosure provides a method for preparing a 3D optical imaging film, including:

step 1: applying a UV curing glue or a thermally sensitive material on a side of a substrate layer and taking it as a micro reflective array layer;

step 2: curing a template press printed micro reflective array layer having a structure opposite to a to-be-pressed micro reflective structure by curing a UV curable glue by illumination or by curing a thermally sensitive material by cooling, so as to obtain the microlens array layer, the template press printed material consisting of Ni, NiCo, an alloy, an NiFe alloy, and NiSiC, etc., and a pressing printing manner being a plane-to-plane manner, or a roll-to-plane manner, or a roll-to-roll manner;

step 3: forming the micro reflective structure in the micro reflective array layer, such as a single-layer dielectric layer, or a multi-layer dielectric layer, or a metal reflective structure, or may be a multi-layer structure formed of a metal reflective structure and a dielectric layer, a dielectric material being magnesium fluoride, titanium dioxide, silicon dioxide, a metal oxide, or a dielectric oxide, etc., a material of the metal being aluminum, silver, copper, or an alloy thereof;

step 4: applying a UV curable glue or a thermally sensitive material on the other side of the substrate layer and taking it as a micro and nano structure layer; and step 5: curing a template press printed micro and nano structure layer having a structure opposite to a to-be-pressed micro and nano structure layer by curing a UV curable glue by illumination or by curing a thermally sensitive material by cooling, so as to obtain the microlens array layer, the template press printed material consisting of Ni, NiCo, an alloy, an NiFe alloy, and NiSiC, etc., a pressing printing manner being a plane-to-plane manner, or a roll-to-plane manner, or a roll-to-roll manner, and the micro and nano structure layer forming an amplified image capable of being viewed by eyes by printing by using an ink, a fluorescer, a magnetic material, a phosphoric material, or a selective absorbing material.

An embodiment of this disclosure provides a micro optical imaging film, including a transparent spacer layer, a micro-transmission focusing unit array layer and a graphic and text variable layer. The transparent spacer layer includes a first surface and a second surface opposing the first surface, the micro-transmission focusing unit array layer is provided on the first surface of the transparent spacer layer, the micro-transmission focusing unit array layer including at least two asymmetrically distributed micro-transmission focusing units, and the graphic and text variable layer is provided on the second surface of the transparent spacer layer, the graphic and text variable layer including at least two micro graphic and text units, the micro graphic and text units including at least two dot matrices in connected or disconnected states, the micro graphic and text units being associated with the micro-transmission focusing units, so that all dot matrices in the connected state form one and only one floating image via the micro-transmission focusing units.

It should be noted here that "one and only one" does not mean one icon or one graphic and text in a conventional sense, such as a multi-channel pattern; the image must have an original image unit, and it may be understood that the image is formed from the original image unit by an optical device; the original image unit here is an integral graphic and text or a graphic and text capable of expressing an integral meaning, such as a logo of a corporation consisting of one more English letters; hence, "one and only one" here is defined according to the original image unit, and a formed image is only one original image unit, that is, "one and only one" here may not judge the number of images according to a connected domain. Furthermore, the "one and only one" floating image does not mean that the micro optical imaging film is only able to form a unique floating image, rather, it means that for micro graphic and text units of the same type (referring to one or more identical micro graphic and text units), all dot matrices in the connected state in the micro graphic and text units may form one unique floating image corresponding to the micro graphic and text units via the micro-transmission focusing units. And for micro graphic and text units of different types (referring to that graphics and texts formed by dot matrices in the connected state in the micro graphic and text units are different), unique floating images formed by the types of micro graphic and text units are different.

The micro optical imaging film provided by the embodiment of this disclosure shall be described in detail below with reference to the accompanying drawings.

Referring to the micro optical imaging film shown in FIG. 18, it includes a transparent spacer layer 910, a micro-transmission focusing unit array layer 911 and a graphic and text variable layer 912. The transparent spacer layer 910 includes a first surface (an upper surface of the transparent spacer layer 910 in FIG. 18) and a second surface opposing the first surface (a lower surface of the transparent spacer layer 910 in FIG. 18). The micro-transmission focusing unit array layer 911 is provided on the first surface of the transparent spacer layer 910, and the graphic and text variable layer 912 is provided on the second surface of the transparent spacer layer.

The transparent spacer layer 910 may be used to adjust a distance between the micro-transmission focusing unit array layer 911 and the graphic and text variable layer 912, that is, it may be used to adjust a focal length of the micro-transmission focusing unit array layer 911. The transparent spacer layer 910 may be a substrate, which may be such a resin as PET (polyethylene terephthalate), PVC (polyvinyl chloride), or PMMA (polymethyl methacrylate). It should be noted that "transparent" in "the transparent spacer layer" may refer to that the transparent spacer layer may be of a transparent material, or may refer to that the transparent spacer layer visually displays transparency, that is, its transmittance may be more than 70%.

The micro-transmission focusing unit array layer 911 may be used to image the graphic and text variable layer 912, provided on the first surface of the transparent spacer layer 910, and may include a number of (i.e. at least two) micro-transmission focusing units 9110, the micro-transmission focusing units 9110 including one or more microlenses, there existing or existing no gap between the multiple microlenses.

The micro-transmission focusing units 9110 may be formed on the first surface of the transparent spacer layer 910, which may be understood as that a surface where a bottom end of the micro-transmission focusing units 9110 in the micro-transmission focusing unit array layer 911 is located and the first surface of the transparent spacer layer 910 contact directly with each other. The micro-transmission focusing units 9110 may also be adhered to the first surface of the transparent spacer layer 910 by an adhesion layer, which may be understood as that the adhesion layer is adhered to between the surface where the bottom end of the micro-transmission focusing units 9110 in the micro-transmission focusing unit array layer 911 is located and the first surface of the transparent spacer layer 910. The micro-transmission focusing units 9110 are distributed with no symmetry (i.e. asymmetrically) on the first surface of the transparent spacer layer 910, so as to form the micro-transmission focusing unit array layer 911. It should be noted that the micro-transmission focusing units being distributed with no symmetry on the first surface of the transparent spacer layer appeared in this text may refer to that multiple micro-transmission focusing units do not have a mirror axis of symmetry, or a central axis of symmetry, etc., on the first surface of the transparent spacer layer, thereby making that the multiple micro-focusing units are not mirror symmetrically or central symmetrically distributed. And the micro-transmission focusing units being distributed with no symmetry on the first surface of the transparent spacer layer may also include that the micro-transmission focusing units are distributed randomly or aperiodically on the first surface of the transparent spacer layer.

The graphic and text variable layer 912 may be used to form variable graphics and texts or micro graphics and texts (i.e. graphics and/or texts of a magnitude of microns), the variation referring to variation in sizes, or shapes, and may be directly adhered to the second surface of the transparent spacer layer 910. The graphic and text variable layer 912 may be a display device containing pixels, such as an LCM (liquid crystal display module). The graphic and text variable layer 912 may include a number of (i.e. at least two) micro graphic and text units, the micro graphic and text units including one or more micro graphics and texts, each micro graphic and text being formed by combining a number of dot matrices in the connected state, or being formed by combining dot matrices in the connected state with brightness reaching preset brightness. Different (i.e. variable) graphics and texts or micro graphics and texts may be formed by connecting or disconnecting different dot matrices. And different (micro) graphics and texts may form different floating images after passing the micro-transmission focusing units, which may satisfy demands of users for forming different images for different application scenarios, thereby improving users' visual experience effects.

The (micro) graphics and texts may be single-channel patterns or multi-channel patterns. The dot matrices may be pixels sites, or may be single or multiple light-emitting sources. Wherein, the pixel sites may be acquired from an LCM display screen, or an OLED (organic light-emitting diode) display screen, or an LED (light-emitting diode) display screen. The LED display screen here may be a backlight source using an LED. The LED may be a single diode, such as a display device of a lamp housing. No matter pixel sites or single or multiple light-emitting sources, micro graphic and text units constituted thereby consist of discrete points. Combinations of different discrete points may form different graphics and texts. Multiple micro graphic and text units may have common dot matrices. For example, a first micro graphic and text unit includes a first dot matrix in the disconnected state and a second in the connected state, a second micro graphic and text unit includes the second dot matrix in the connected state, and the first micro graphic and text unit and the second micro graphic and text unit have the common second dot matrix.

The micro graphic and text units are associated with the micro-transmission focusing units, so that the dot matrices in the connected state form one and only one floating image via the micro-transmission focusing units, that is, so that the micro graphic and text units form one and only one floating image via the micro-transmission focusing units. The association may be that the position coordinates of the micro graphic and text units are obtained by performing preset transform on the position coordinates of the micro-transmission focusing units located on the first surface of the transparent spacer layer. The preset transform may include coordinate scaling transform and/or coordinate rotational transform, or a combination thereof; however, it is not limited thereto, and what described above may be referred to for details, which shall not be described herein any further.

Achievement of the amplified image of the micro graphics and texts of the display device containing pixels may include following relationships:

(1) obtaining the positions coordinates of the micro graphic and text units by preset transform according to the positions coordinates of the micro-transmission focusing units, the preset transform including coordinate scaling transform or coordinate rotational transform, or a combination thereof; and (2) determining via a program that a most center of the liquid crystal display module (i.e. the display device) is a coordinate origin (0,0), the coordinate position being a physical position of the display device, obtaining the position coordinates of the micro graphic and text units after performing transform on above step (1), determining pixel positions (x/a, y/a) according to a pixel period a or a pixel size and physical coordinates, determining the number (d/a) of pixels corresponding to the micro-transmission focusing units according to an aperture d of the micro-transmission focusing units and the pixel period a, and tracing needed micro graphic and text units by using the determined pixel sites.

In an embodiment, a remained part of the first surface of the transparent spacer layer (a part of the first surface with the micro-focusing units being removed) or a remained part of the second surface of the transparent spacer layer (a part of the second surface with the micro graphic and text units being removed) is provided with the following: a holographic anti-counterfeiting unit, a Fresnel relief structure unit, an optical transform unit, a sub-wavelength micro structure unit, a motion-sensing optical transform unit, a printed pattern, a dielectric layer, a metal layer, or is/are coated with an ink, a fluorescer, a magnetic material, a phosphoric material, a selective absorbing material, or has a micronano structure.

In an embodiment, a thickness of the transparent spacer layer is between 10 microns and 5000 microns, and preferably less than 1000 microns. A material of the transparent spacer layer may be PC, PVC, PET, PMMA, a UV sensitive curing glue, a glass, or BOPP, etc., and preferably PET and a UV sensitive curing glue.

In an embodiment, the micro-focusing units may be refractive and reflective units or diffractive and reflective units. When the micro-focusing units 110 are refractive and reflective units, such as a 1D cylindrical mirror, a 2D spherical mirror, or an aspherical mirror, their sizes of apertures may be between 10 microns and 1000 microns, and preferably between 25 microns and 500 microns. The micro-focusing units may be micro-focusing units, and their numerical apertures may be 0.1 micron to 4.0 microns, and preferably less than 2.0 microns.

A material of the micro-focusing units may be PC, PVC, PET, PMMA, a UV sensitive curing glue, a glass, or BOPP, etc., and preferably a UV sensitive curing glue.

In an embodiment, in order that the micro graphic and text units and the micro-focusing units achieve a better imaging effect, a distance between the micro graphic and text units and a focal plane of the micro-focusing units may be less than or equal to 20% of a focal length focusing the micro-focusing units.

In an embodiment, a total thickness of the micro graphic and text units, the transparent spacer layer and the micro-transmission focusing units (such as a distance between a top end of the micro-transmission focusing units 9110 and a bottom end of the micro graphic and text units 9120 in FIG. 1) may be between two times of a radius of curvature of the micro-transmission focusing units and sixteen times of the radius of curvature of the micro-transmission focusing units, so that the micro graphic and text units image clearly.

In an embodiment, in order that suitability of the micro-transmission focusing units is better, an effective diameter of the micro-focusing units (i.e. a distance between focuses of lenses) may be between 20 microns and 1000 microns, in particular, 20 μm-500 μm, or 55 μm-200 μm, or 300 μm-450 μm. For example, for special demands in some fields, the effective diameter of the micro-transmission focusing units may be 550 μm-900 μm.

In an embodiment, in order that the imaging effect of the micro optical imaging film is better, the focal length of the micro-focusing units may be between 10 micron and 2000 microns, in particular, 20 μm-100 μm, or 200 μm-450 μm, or 550 μm-900 μm, or 1050 μm-1500 μm.

In an embodiment, for the micro optical imaging film to be able to be used in more fields, a total thickness of the micro optical imaging film may be less than 5000 microns. For example, if the micro optical imaging film is designed for a high-end or ultrathin purpose, the film may adopt a structure with no substrate or with a thin substrate, and at this moment, the total thickness of the micro optical imaging film may be 20 μm-200 μm. When the micro optical imaging film is used in a product with a relatively small volume and a requirement on thickness is not high, the total thickness of the micro optical imaging film may be 300 μm-500 μm. And when the micro optical imaging film is used in a large ornament, the transparent space layer may be glass or a film of a thickness of glass. At this moment, the total thickness of the micro optical imaging film may be 600 μm-1000 μm, or even more large, such as 1200 μm, 1300 μm, 1500 μm, 2000 μm, 2500 μm, 3500 μm, or 4500 μm.

Figure 18A:
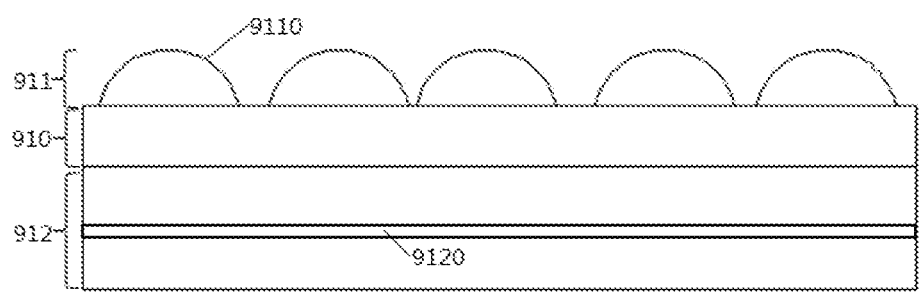
FIG. 18a is a schematic diagram of a structure of the micro optical imaging film in this disclosure.
Figure 18B:
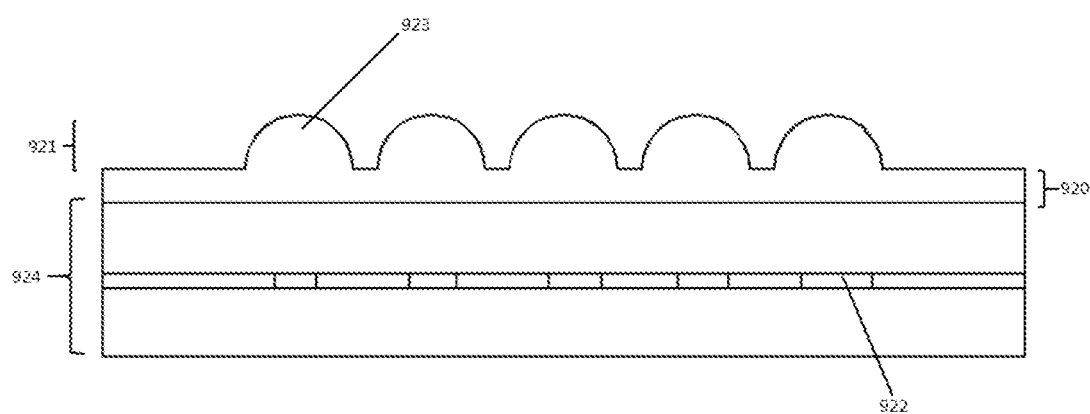
FIG. 18b is a schematic diagram of another structure of the micro optical imaging film in this disclosure.

The embodiment of this disclosure further provides another micro optical imaging film, as shown in FIG. 18b. The micro optical imaging film includes a transparent spacer layer 920, a micro-transmission focusing unit array layer 921 and a graphic and text variable layer 924. The transparent spacer layer 920 includes a first surface (an upper surface of the transparent spacer layer 920 in FIG. 18b) and a second surface opposing the first surface (a lower surface of the transparent spacer layer 920 in FIG. 18b). The micro-transmission focusing unit array layer 921 is formed on the first surface of the transparent spacer layer 920, and the graphic and text variable layer 924 is provided on the second surface of the transparent spacer layer 920.

The micro-transmission focusing unit array layer 921 includes a number of micro-transmission focusing units 923 distributed with no axis of symmetry. The micro-transmission focusing units 923 may be directly formed on the first surface of the transparent spacer layer 920. And the micro-transmission focusing unit array layer 921 and the transparent spacer layer 920 form an integral structure, that is, there exists no interface between the micro-transmission focusing unit array layer 921 and the transparent spacer layer 920, which is advantageous to reducing a thickness of the film.

The graphic and text variable layer 924 may be located on the second surface of the transparent spacer layer 920, and include a number of micro graphic and text units 922, the micro graphic and text units 922 being formed by combining a number of dot matrices. And the graphic and text variable layer 924 may be a display device containing pixels, such as an LCM.

Differences between the micro optical imaging film shown in FIG. 18b and the micro optical imaging film shown in FIG. 18a exist in that the micro-transmission focusing units 923 in FIG. 18b may be directly formed on the first surface of the transparent spacer layer 920, and there exists no interface between the micro-transmission focusing unit array layer 921 and the transparent spacer layer 920.

Description of the micro optical imaging film shown in FIG. 18a may be referred to for particular description of the micro optical imaging film shown in FIG. 18b, which shall not be described herein any further.

Figure 18C:
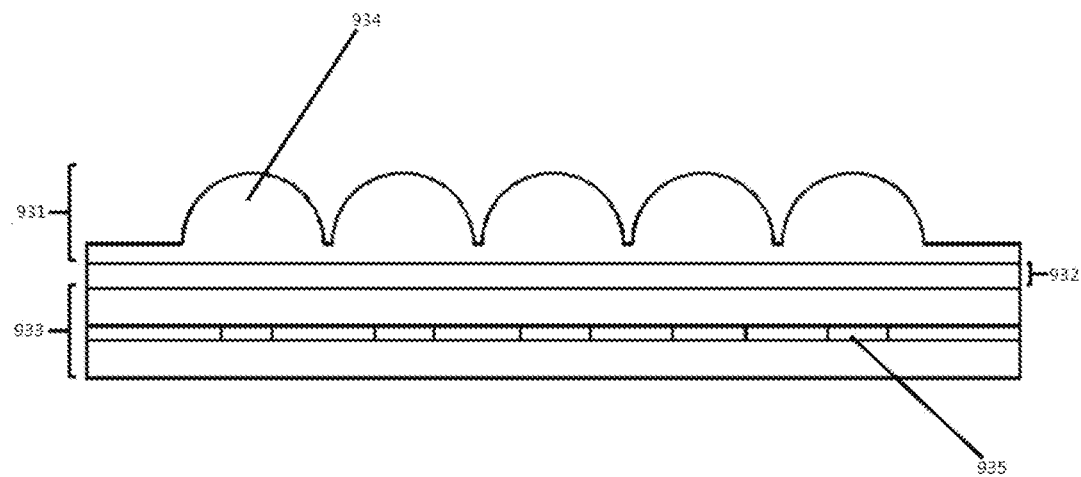
FIG. 18c is a schematic diagram of a further structure of the micro optical imaging film in this disclosure.

The embodiment of this disclosure further provides a further micro optical imaging film, as shown in FIG. 18c. The micro optical imaging film includes a transparent spacer layer 932, a micro-transmission focusing unit array layer 931 and a graphic and text variable layer 933. The transparent spacer layer 932 includes a first surface (an upper surface of the transparent spacer layer 932 in FIG. 18c) and a second surface opposing the first surface (a lower surface of the transparent spacer layer 932 in FIG. 18c). The micro-transmission focusing unit array layer 931 is formed on the first surface of the transparent spacer layer 932, and the graphic and text variable layer 933 is provided on the second surface of the transparent spacer layer 932.

The micro-transmission focusing unit array layer 931 includes a number of micro-transmission focusing units 934 distributed with no axis of symmetry. The micro-transmission focusing units 934 may be formed within the micro-transmission focusing unit array layer, with its top end being located on a surface of the micro-transmission focusing unit array layer 931, and its bottom end not contacting another surface of the micro-transmission focusing unit array layer 931 opposing the surface. And the other surface of the micro-transmission focusing unit array layer 931 may directly contact the first surface of the transparent spacer layer 920, or may contact the first surface of the transparent spacer layer 920 via an adhesion layer.

The graphic and text variable layer 933 may be located on the second surface of the transparent spacer layer 932, and include a number of micro graphic and text units 935, the micro graphic and text units 935 being formed by combining a number of dot matrices. And the graphic and text variable layer 933 may be a display device containing pixels, such as an LCM.

A difference between the micro optical imaging film shown in FIG. 18c and the micro optical imaging film shown in FIG. 18a exists in that the micro-transmission focusing units 934 in FIG. 18c is not located on the surface of the micro-transmission focusing unit array layer 931 contacting the first surface of the transparent spacer layer 932.

Description of the micro optical imaging film shown in FIG. 18a may be referred to for particular description of the micro optical imaging film shown in FIG. 18c, which shall not be described herein any further.

Figure 19:
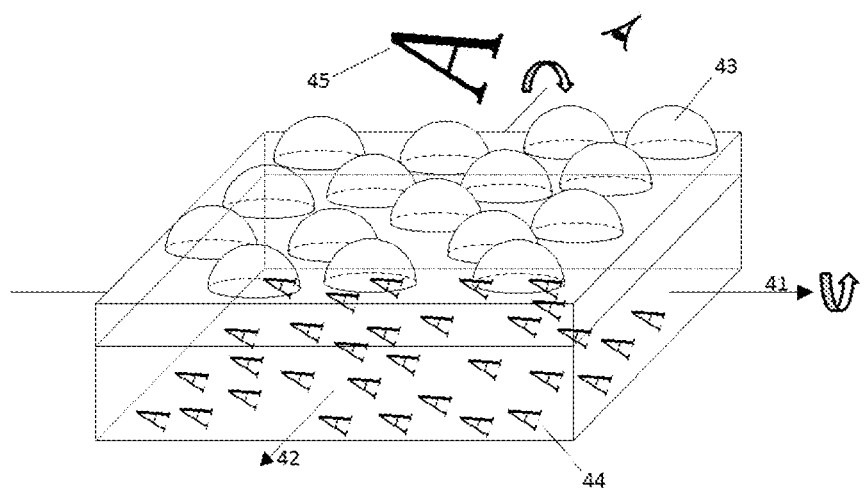
FIG. 19 is a schematic diagram of a visual effect of the micro optical imaging film in this disclosure.

FIG. 19 shows a schematic diagram of a visual effect of the micro optical imaging films shown in FIGS. 18a-18c. It can be seen from FIG. 19 that viewing from a side of the first surface of the transparent spacer 40, the micro optical imaging film forms a floating amplified image 45 floating between the first surface of the transparent spacer layer 40 and the viewer, the number of the amplified image 45 being one and only one, and the amplified image being formed by the micro graphic and text units 44 after being amplified by the micro-focusing unit array layer 43. When the imaging film is rotated around an axis 41 or an axis 42 or is tilted side to side or forward and backward, no other image 45 of the amplified micro graphic and text units will enter into a viewing region. The viewing region may generally denote a region occupied by the first surface, and the image may be a single-channel pattern or a multi-channel pattern.

It can be seen from the above description that in the embodiments of this disclosure, by setting the micro-transmission focusing units in the micro-transmission focusing unit array layer to be distributed asymmetrically, setting the micro graphic and text units in the graphic and text variable layer to include at least two dot matrices in the connected state, and associating the micro-transmission focusing units with the micro graphic and text units, one and only one floating image corresponding to the graphic and text variable layer is formed in the viewing region, thereby achieving providing an imaging film having a unique floating image.

Figure 20:
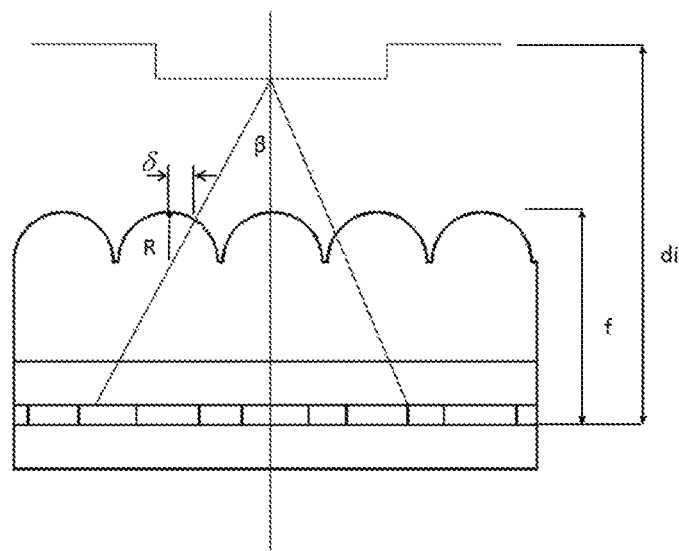
FIG. 20 is a schematic diagram of an implementation principle of the micro optical imaging film in this disclosure.

A principle of achieving the floating amplified image by the structure provided by this disclosure is as shown in FIG. 20, and the above description may be referred to for details, which shall not be described herein any further.

Figure 21:
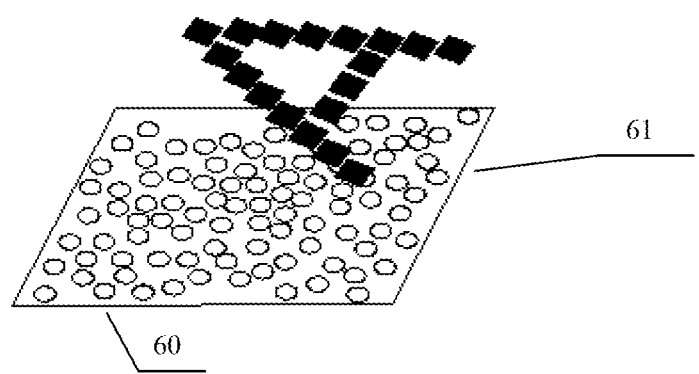
FIG. 21 is a schematic diagram of an imaging effect of the micro optical imaging film in this disclosure.

Referring to FIG. 21, a micro optical imaging film is an example is shown. The display device 60 is provided with a micro optical imaging film 61 thereon, and may be one of an LCM, an LED and an OLED, but it is not limited thereto. A part or the whole of the display device 60 may have the features of the micro optical imaging film, as shown in FIG. 21.

In an embodiment, in order to obtain the micro optical imaging film based on the above technical solutions, this disclosure provides a method for preparing a micro optical imaging film, including:

step 1: applying a curing glue or a thermally sensitive material on a side of a substrate layer and taking it as a micro-transmission focusing unit array layer; and step 2: curing a template press printed micro-transmission focusing unit array layer having a structure opposite to a to-be-pressed focusing element layer structure by curing an actinically curable glue by illumination or by curing a thermally sensitive material by cooling, so as to obtain the micro-transmission focusing unit array layer, the template press printed material consisting of Ni, NiCo, and an NiFe alloy, and NiSiC, etc., and may also be such organic synthetic high molecular materials as polyethylene (PE), and polycarbonate (PC) resin, etc., and a pressing printing manner being a plane-to-plane manner, or a roll-to-plane manner, or a roll-to-roll manner.

In practical use, the graphic and text variable layer in the micro optical imaging film provided in the embodiments of this disclosure may be a liquid crystal display module of a size of 65 inches, a size of a pixel of which being 375 microns. Total 25*25 pixels constitute a micro graphic and text unit, and an aperture of a micro-transmission focusing unit corresponding to it may be 9500 microns. And an amplified graphic and text of a size of 1.87 meters and a floating height of 1 meter may be viewed from the side of the micro-transmission focusing unit.

An embodiment of this disclosure provides a micro optical imaging system, including a micro optical imaging film and a control device; the micro optical imaging film including: a transparent spacer unit (i.e. a transparent spacer layer), a micro-transmission focusing unit array layer and a graphic and text variable layer. The transparent spacer unit includes a first surface and a second surface opposing the first surface, the micro-transmission focusing unit array layer is provided on the first surface of the transparent spacer unit and includes at least two asymmetrically distributed micro-transmission focusing units, the graphic and text variable layer is provided on the second surface of the transparent spacer unit and includes at least two micro graphic and text units, the micro graphic and text units including at least two dot matrices in connected and/or disconnected states. Position coordinates of the micro graphic and text units may be obtained by performing preset transform on position coordinates of the micro-transmission focusing units. The preset transform is transform functions having one and only one fixed point, so that all dot matrices in the connected state form one and only one floating image via the micro-transmission focusing units. And the control device is configured to control connection, disconnection and/or display brightness of the dot matrices. Previous description may be referred to for a structure of the micro optical imaging film, which shall not be described herein any further.

It can be seen from the above description that in the embodiments of this disclosure, by setting the micro-transmission focusing units in the micro-transmission focusing unit array layer to be distributed asymmetrically, setting the micro graphic and text units in the graphic and text variable layer to include at least two dot matrices in the connected or disconnected state, and associating the micro-transmission focusing units with the micro graphic and text units, one and only one floating image corresponding to the graphic and text variable layer is formed in the viewing region, thereby achieving providing an imaging film having a unique floating image.

It should be noted that although the operational steps of the method described in the above embodiments or flowcharts are provided in this disclosure, based on the convention or works without inventiveness, the method may include more or less operational steps. In steps in which there logically exists no necessary causality, an order of execution of the steps is not limited to those provided by this disclosure.

In order that the above objects, features and benefits of this disclosure to be more clear and easy to be understood, particular embodiments of this disclosure are described above in detail with reference to the accompanying drawings. Many details are given in the above description, so that this disclosure is fully understood. However, this disclosure may be carried out in many other ways than those described above, and similar modifications may be made by those skilled in the art without departing from the spirits of this disclosure, hence, this disclosure is not limited to the particular embodiments disclosed above. And furthermore, various technical features of the above embodiments may be arbitrarily combined. For the sake of simplicity of description, not all possible combinations of the various technical features of the above embodiments are described; however, combinations of these technical features should be deemed as being within the scope of this description only if there exists no contradiction therebetween.

The above embodiments only express some implementations of this disclosure, and their description is particular and in detail; however, it should be understood that they are not intended to limit the protection scope of the disclosure. It should be noted that any modifications, improvements and the like may be made by those skilled in the art within the spirits and principle of this disclosure. Therefore, the protection scope of the disclosure should be defined by the appended claims.

The invention claimed is:

1. A 3D floating imaging optical film comprising:
   a transparent spacer layer having two surfaces opposing to each other;
   a micro-focusing unit array layer provided on one of the surfaces of the transparent spacer layer, the micro-focusing unit array layer comprising a number of asymmetrically distributed micro-focusing units; and
   a micro graphic and text unit array layer provided on another surface of the transparent spacer layer opposite the micro-focusing unit array layer, the micro graphic and text unit array layer comprising a number of micro graphic and text units;
   the micro-focusing unit array layer being adapted to the micro graphic and text unit array layer, so that the 3D floating imaging optical film is able to form one and only one floating image floating in the transparent spacer layer when the 3D floating imaging optical film is viewed from a side of the micro graphic and text units or a side of the micro-focusing units; wherein, a height of the floating image is calculated as:

$$d_i = \frac{f - R}{1 - \frac{X_{MPA}}{X_{MLA}}} + R,$$

wherein, $d_i$ is the height of the floating image, R is a radius of curvature of the micro-focusing units, f is a focal length of the micro-focusing units, $x_{MLA}$ is a coordinate value of the micro-focusing units, and $x_{MPA}$ is a coordinate value of the micro graphic and text units;
wherein aperiodic distribution of the micro-focusing units are obtained by transforming square dot matrices according to functions $\xi_i = -x_{oi} - \text{arg sinh}(y_{oi})$, $\eta_i = y_{oi} - \text{arg sinh}(x_{oi})$ and taking coordinates of the dot matrices as centers of the micro-focusing units, where, $x_{oi}$ and $y_{oi}$ are the position coordinates of the square dot matrices, $\xi_i$ and $\eta_i$ are the position coordinates of the micro-focusing units;
wherein position coordinates of the micro graphic and text units are obtained by transforming position coordinates of the corresponding micro-focusing units;
wherein the transform comprises one of the following or a combination thereof: a coordinate scaling transform and a coordinate rotational transform.

2. The 3D floating imaging optical film according to claim 1, wherein a function of transform of the position coordinates of the micro graphic and text units and position coordinates of the micro-focusing units has one and only one fixed point.

3. The 3D floating imaging optical film according to claim 1, wherein the micro-focusing units comprise a micro-focusing portion, and a reflective structure provided on the surface of the micro-focusing portion facing away from the transparent spacer layer.

4. The 3D floating imaging optical film according to claim 1, wherein a total thickness of the micro-focusing unit array layer, the transparent spacer layer and the micro graphic and text unit array layer is between a half and three times of a radius of curvature of the micro-focusing units.

5. The 3D floating imaging optical film according to claim 1, wherein the floating image formed by the 3D floating imaging optical film is constituted by a number of the graphic and text units that are amplified.

6. The 3D floating imaging optical film according to claim 1, wherein the micro graphic and text unit comprises one of the following or a combination thereof: a micro-printed pattern, a filling pigment, a surface microreliefed micro pattern of a dye, a micro pattern of a linear structure and a printed pattern.

7. The 3D floating imaging optical film according to claim 1, wherein a distance between the micro graphic and text units and a focal plane of the micro-focusing units is less than or equal to 20% of a focal length focusing the micro-focusing units.

8. A micro optical imaging film comprising:
   a transparent spacer layer having a first surface and a second surface opposing to the first surface;
   a micro-transmission focusing unit array layer provided on the first surface of the transparent spacer layer, the micro-transmission focusing unit array layer comprising at least two asymmetrically distributed micro-transmission focusing units; and a graphic and text variable layer provided on the second surface of the transparent spacer layer, the graphic and text variable layer comprising at least two micro graphic and text units, the micro graphic and text units comprising dot matrices having connected and/or disconnected states;

the micro graphic and text units being adapted to the micro-transmission focusing units, so that the micro optical imaging film forms one and only one floating image at a side of the micro-transmission focusing units away from the micro graphic and text units via all dot matrices in the connected state; wherein, a height of the floating image is calculated as:

$$d_i = \frac{f - R}{1 - \frac{X_{MPA}}{X_{MLA}}} + R,$$

wherein, $d_i$ is the height of the floating image, R is a radius of curvature of the micro-transmission focusing units, f is a focal length of the micro-transmission focusing units, $X_{MLA}$ is a coordinate value of the micro-transmission focusing units, and $x_{MPA}$ is a coordinate value of the micro graphic and text units;

wherein aperiodic distribution of the micro-transmission focusing units are obtained by transforming square dot matrices according to functions $\xi_i = -x_{oi} - \arg\sinh(y_{oi})$, $\eta_i = y_{oi} - \arg\sinh(x_{oi})$ and taking coordinates of the dot matrices as centers of the micro-transmission focusing units, where, $x_{oi}$, and $y_{oi}$, are the position coordinates of the square dot matrices, $\xi_i$ and $\eta_i$ are the position coordinates of the micro-transmission focusing units;

wherein position coordinates of the micro graphic and text units are obtained by transforming position coordinates of the corresponding micro-transmission focusing units;

wherein the transform comprises one of the following or a combination thereof: a coordinate scaling transform and a coordinate rotational transform.

9. The micro optical imaging film according to claim 8, wherein adaption of the graphic and text variable layer with the micro-transmission focusing unit array layer comprises position coordinates of the micro graphic and text units being able to be obtained by performing preset transform on position coordinates of the micro-transmission focusing units.

10. The micro optical imaging film according to claim 8, wherein the preset transform comprises coordinate scaling transform and/or coordinate rotational transform.

11. The micro optical imaging film according to claim 8, wherein the micro-transmission focusing unit array layer and the transparent spacer layer is an integral structure.

12. The micro optical imaging film according to claim 8, wherein a total area occupied by the micro-transmission focusing unit array layer in the first surface of the transparent spacer layer is more than 60% of a total area of the first surface.

13. The micro optical imaging film according to claim 8, wherein the dot matrices comprise pixel sites, a single light-emitting source, or multiple light-emitting sources.

14. The micro optical imaging film according to claim 8, wherein the at least two micro graphic and text units have common dot matrices.

15. The micro optical imaging film according to claim 8, wherein the graphic and text variable layer is a display device containing pixels.

* * * * *